United States Patent
Ma et al.

(10) Patent No.: US 9,718,031 B2
(45) Date of Patent: Aug. 1, 2017

(54) COMPOSITE HOLLOW FIBER MEMBRANES USEFUL FOR $CO_2$ REMOVAL FROM NATURAL GAS

(71) Applicants: Canghai Ma, Newark, DE (US); William John Koros, Atlanta, GA (US)

(72) Inventors: Canghai Ma, Newark, DE (US); William John Koros, Atlanta, GA (US)

(73) Assignees: Chevron U.S.A. Inc., San Ramon, CA (US); Georgia Tech Research Corporation, Atlanta, GA (US)

( * ) Notice: Subject to any disclaimer, the term of this patent is extended or adjusted under 35 U.S.C. 154(b) by 327 days.

(21) Appl. No.: 14/323,443

(22) Filed: Jul. 3, 2014

(65) Prior Publication Data

US 2015/0011815 A1    Jan. 8, 2015

Related U.S. Application Data

(60) Provisional application No. 61/843,237, filed on Jul. 5, 2013.

(51) Int. Cl.
*B01D 71/64* (2006.01)
*B01D 53/22* (2006.01)
(Continued)

(52) U.S. Cl.
CPC ........... *B01D 71/64* (2013.01); *B01D 53/228* (2013.01); *B01D 67/0006* (2013.01);
(Continued)

(58) Field of Classification Search
CPC .. B01D 53/228; B01D 67/0006; B01D 69/08; B01D 69/088; B01D 69/125;
(Continued)

(56) References Cited

U.S. PATENT DOCUMENTS

| | | | |
|---|---|---|---|
| 4,164,437 A | 8/1979 | Henne et al. | |
| 5,085,676 A * | 2/1992 | Ekiner | B01D 69/08 210/500.23 |

(Continued)

OTHER PUBLICATIONS

L. Jiang et al., "Fabrication of Matrirnid/polyethersulfone dual-layer hollow fiber membranes for gas separation", Journal of Membrane Science, 2004, vol. 240, pp. 91-103.

(Continued)

*Primary Examiner* — Jason M Greene
(74) *Attorney, Agent, or Firm* — E. Joseph Gess; Melissa M. Hayworth

(57) ABSTRACT

Disclosed herein is a composite hollow fiber polymer membrane including a porous core layer and a selective sheath layer. The porous core layer includes a polyamide-imide polymer, or a polyetherimide polymer, and the selective sheath layer includes a polyimide polymer, which is prepared from monomers A, B, and C. The monomer A is a dianhydride of the formula

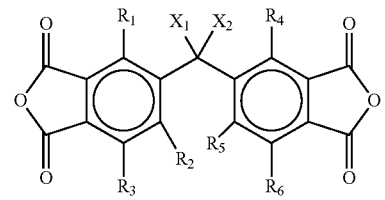

wherein $X_1$ and $X_2$ are independently halogenated alkyl group, phenyl or halogen and $R_1$, $R_2$, $R_3$, $R_4$, $R_5$, and $R_6$ are independently H, alkyl, or halogen. The monomer B is a diamino cyclic compound without a carboxylic acid functionality and the monomer C is a diamino cyclic compound (Continued)

US 9,718,031 B2

Page 2 with a carboxylic acid functionality. The polyimide polymer further includes covalent ester crosslinks. Also disclosed herein is a method of making the composite polymer membrane and a process for purifying natural gas utilizing the composite polymer membrane.

19 Claims, 16 Drawing Sheets

(51) Int. Cl.
| | |
|---|---|
| B01D 69/08 | (2006.01) |
| B01D 69/12 | (2006.01) |
| B01D 67/00 | (2006.01) |
| B29C 47/00 | (2006.01) |
| B29D 23/00 | (2006.01) |
| C07C 7/144 | (2006.01) |
| B01D 71/56 | (2006.01) |
| C10L 3/10 | (2006.01) |
| B29L 23/00 | (2006.01) |
| B29K 77/00 | (2006.01) |
| B29K 79/00 | (2006.01) |

(52) U.S. Cl.
CPC .......... *B01D 69/08* (2013.01); *B01D 69/088* (2013.01); *B01D 69/125* (2013.01); *B01D 71/56* (2013.01); *B29C 47/0014* (2013.01); *B29D 23/00* (2013.01); *C10L 3/104* (2013.01); B01D 2323/30 (2013.01); B29C 47/0004 (2013.01); B29D 23/001 (2013.01); B29K 2077/00 (2013.01); B29K 2079/085 (2013.01); B29L 2023/00 (2013.01); C10L 2290/548 (2013.01); Y02P 70/26 (2015.11)

(58) Field of Classification Search
CPC .... B01D 71/56; B01D 71/64; B01D 2323/30; B01D 2257/504; C10L 3/101; C10L 3/104
See application file for complete search history.

(56) References Cited

U.S. PATENT DOCUMENTS

| 5,681,473 | A | * | 10/1997 | Miller | B01D 61/02 210/640 |
|---|---|---|---|---|---|
| 5,928,410 | A | * | 7/1999 | Jois | B01D 53/228 55/DIG. 5 |
| 6,755,900 | B2 | | 6/2004 | Koros et al. | |
| 6,932,859 | B2 | | 8/2005 | Koros et al. | |
| 7,247,191 | B2 | | 7/2007 | Koros et al. | |
| 7,981,974 | B2 | | 7/2011 | Miller et al. | |
| 8,066,799 | B2 | | 11/2011 | Miller et al. | |
| 8,337,586 | B2 | | 12/2012 | Wind et al. | |
| 8,377,172 | B2 | | 2/2013 | Koros et al. | |
| 8,394,182 | B2 | | 3/2013 | Koros et al. | |
| 2006/0156920 | A1 | * | 7/2006 | Ekiner | B01D 53/228 95/45 |
| 2010/0276368 | A1 | * | 11/2010 | Gonzalez | B01D 53/228 210/651 |
| 2011/0092840 | A1 | * | 4/2011 | Forbes | A61B 5/0876 600/538 |
| 2011/0266223 | A1 | | 11/2011 | Yang et al. | |
| 2012/0111191 | A1 | * | 5/2012 | Koros | B01D 53/228 95/51 |
| 2015/0105481 | A1 | * | 4/2015 | Hessing | C02F 1/469 521/27 |
| 2015/0190762 | A1 | * | 7/2015 | Van Kessel | B01D 53/228 96/12 |

OTHER PUBLICATIONS

I. Pinnau et al., "Ultrathin Multicomponent Poly(ether sulfone) Membranes for Gas Separation Made by Dry/Wett Phase Inversion", Ind. Eng. Chem. Res., 1990, vol. 29, pp. 2028-2032.
S. C. Pesek et al., "Aqueous quenched asymmetric polysulfone membranes prepared by dry/wet phase separation", Journal of Membrane Science, 1993, vol. 81, pp. 71-88.
S. Husain et al., "Mixed matrix hollow fiber membranes made with modified HSSZ-13 zeolite in polyetherimide polymer matrix for gas separation", Journal of Membrane Science, 2007, vol. 288, pp. 195-207.
Wallace, David William, "Crosslinked Hollow Fiber Membranes for Natural Gas Purification and Their Manufacture from Novel Polymers", PhD Dissertation, in: Chemical Engineering, The University of Texas at Austin, Austin, TX, 2004.
C. C. Pereira et al., "Hollow fiber membranes obtained by simultaneous spinning of two polymer solutions: a morphological study", Journal of Membrane Science, 2003, vol. 226, pp. 35-50.
Strathmann, H. "Membrane Separation Processes: Current Relevance and Future Opportunities", AIChE Journal, 2001, vol. 47, No. 5, pp. 1077-1087.
D. F. Li et al., "Fabrication of fluoropolyimide/polyethersulfone (PES) dual-layer asymmetric hollow fiber membranes for gas separation", Journal of Membrane Science, 2002, vol. 198, pp. 211-223.
Liu, Junqiang, "Development of Next Generation Mixed Matrix Hollow Fiber Membranes for Butane Isomer Separation", PhD Dissertation, in: School of Chemical & Biomolecular Engineering, Georgia Institute of Technology, Atlanta, GA, 2010.
D. F. Li et al., "Morphological aspects and structure control of dual-layer asymmetric hollow fiber membranes formed by a simultaneous co-extrusion approach", Journal of Membrane Science, 2004, vol. 243, pp. 155-175.
Y. Li et al., "Dual-layer polyethersulfone (PES)/BTDA-TDI/MDI co-polyimide (P84) hollow fiber membranes with a submicron PES-zeolite beta mixed matrix dense-selective layer for gas separation", Journal of Membrane Science, 2006, vol. 277, pp. 28-37.
Y. Liu et al., "Chemical Cross-Linking Modification of Polyimide/Ply(ethersulofone) Dual-Layer Hollow-Fiber Membranes for Gas Separation", Ind. Eng. Chem. Res., 2003, vol. 42, pp. 1190-1195.
I. C. Omole et al., "Effects of CO2 on a High Performance Hollow-Fiber Membrane for Natural Gas Purification", Ind. Eng. Chem. Res., 2010, vol. 49, pp. 4887-4896.
I. C. Omole et al., "Toluene impurity effects on CO2 separation using a hollow fiber membrane for natural gas", Journal of Membrane Science, 2011, vol. 369, pp. 490-498.
I. C. Omole et al., "Increased Molecular Weight of a Cross-Linkable Polyimide for Spinning Plasticization Resistant Hollow Fiber Membranes", Macromolecules, 2008, vol. 41, pp. 6367-6375.
Omole, Imona C., "Crosslinked Polyimide Hollow Fiber Membranes for Aggressive Natural Gas Feed Streams", PhD Dissertation, in: Chemical and Biomolecular Engineering, Georgia Institute of Technology, Atlanta, GA, 2008.
W. J. Koros et al., "Membrane-based gas separation", Journal of Membrane Science, 1993, vol. 83, pp. 1-80.
Vanherck, K. et al. "Crosslinking polyimides for membrane applications: A review" Progress in Polymer Science vol. 38, issue 6, pp. 874-896, Nov. 20, 2012.
International Search Report from corresponding PCT application PCT/US2014/045408 mailed Oct. 27, 2014.

\* cited by examiner

COMPOSITE HOLLOW FIBER MEMBRANES USEFUL FOR CO₂ REMOVAL FROM NATURAL GAS

BACKGROUND OF THE INVENTION

Field of the Art

The present disclosure relates to an ester-crosslinkable composite hollow fiber membrane prepared using a 4,4'-(hexafluoroisopropylidone)dipthalic anhydride (6FDA)-based polyimide and a polyamide-imide or polyetherimide polymer. More specifically, provided is a composite hollow fiber membrane that demonstrates high separation performance for hydrocarbon contaminants making it useful for natural gas separation.

Description of the Related Art

Natural gas processing occurs prior to sending natural gas to the distribution pipeline for sale. Natural gas processing involves removing impurities such as carbon dioxide ($CO_2$), water ($H_2O$), and hydrogen sulfide ($H_2S$) from natural gas. Acid gas removal refers to removing $CO_2$ and $H_2S$ from natural gas, while dehydration refers to removing $H_2O$ from natural gas.

Specifications for sales gas require $CO_2$ removal. For example, U.S. pipeline specifications require that sales gas contain ≤2 mol % $CO_2$. $CO_2$ removal processes include solvent (e.g., amine) absorption, cryogenic distillation, adsorption processes, and membrane separation.

Similarly, since both associated natural gas and non-associated natural gas contain water, natural gas must be subjected to $H_2O$ removal. The water content of associated and non-associated natural gas can range from below saturation to 100% saturation. Thus, natural gas always requires dehydration. Suitable dehydration processes include absorption (e.g., by glycol or molecular sieves) and membrane separation.

Since $H_2S$ can be extremely harmful to human health and corrosive, natural gas is also generally subjected to $H_2S$ removal. Amine (e.g., monoethanolamine or diethanolamine) absorption typically removes $H_2S$.

These impurity removal processes typically occur in series. In most cases, dehydration follows $CO_2$ removal because $CO_2$ removal often increases water content. For example, solvent absorption (e.g., amine absorption) is water based and, consequently, saturates the natural gas. As a result, this water saturated gas then requires treatment to remove water. This water removal step, like any additional step in a series of steps, is undesirable because it increases capital costs and operating costs for natural gas processing.

As discussed above, membrane separation is a separation process useful for removing impurities from natural gas. For natural gas applications, membranes having both high $CO_2/CH_4$ selectivity and high $CO_2$ permeability are desired. High selectivity for $CO_2$ over $CH_4$ minimizes loss of methane, a valuable component of natural gas, to the permeate stream. High $CO_2$ permeability decreases the required membrane area for a particular separation. However, while membrane separation may be useful and desirable for natural gas applications, it is difficult to produce membranes having both high $CO_2/CH_4$ selectivity and high $CO_2$ permeability.

Most commercially available polymer membranes have high $CO_2$ permeability and low to moderate $CO_2/CH_4$ selectivity or low to moderate $CO_2$ permeability and high $CO_2/CH_4$ selectivity. While some high performance specialty polymer membranes having both high $CO_2/CH_4$ selectivity and $CO_2$ permeability have been developed, these specialty membranes are not commercially available and have a high cost.

Utilizing a composite polymer membrane having a thin, selective outer layer of high performance specialty polymer on a porous substructure layer made of an inexpensive polymer reduces membrane cost. While composite polymer membranes are known in the art, they are difficult to produce due to the difficulty in finding compatible polymers for the selective outer layer and the porous substructure layer.

Dual-layer hollow spinning technology is commonly used to produce defect-free composite hollow fibers through the so-called dry-jet/wet-quench process by simultaneous extrusion of two polymer solutions without adding a post-spinning coating step (see L. Y. Jiang, T. S. Chung, D. F. Li, C. Cao, A. Kulprathipanja, Fabrication of Matrimid/polyethersulfone dual-layer hollow fiber membranes for gas separation, J. Membrane Sci., 240 (2004) 91-103; I. Pinnau, J. Wind, K. V. Peinemann, Ultrathin Multicomponent Poly (Ether Sulfone) Membranes for Gas Separation Made by Dry Wet Phase Inversion, Ind. Eng. Chem. Res., 29 (1990) 2028-2032; S. C. Pesek, W. J. Koros, Aqueous Quenched Asymmetric Polysulfone Membranes Prepared by Dry Wet Phase-Separation, J. Membrane Sci., 81 (1993) 71-83; and S. Husain, W. J. Koros, Mixed matrix hollow fiber membranes made with modified HSSZ-13 zeolite in polyetherimide polymer matrix for gas separation, J. Membrane Sci., 288 (2007) 195-207). This efficient process provides economical alternative defect-free hollow fibers that eliminate instability in "caulked" hollow fibers under aggressive feed conditions (D. W. Wallace, Crosslinked Hollow Fiber Membranes for Natural Gas Purification and Their Manufacture from Novel Polymers, Ph.D. Dissertation, in: Chemical Engineering, The University of Texas at Austin, Austin, Tex., 2004). Composite hollow fiber membranes, therefore, combine the advantages of lower cost polymers as the supporting non-selective core layer and high performance polymer as the selective sheath layer (C. C. Pereira, R. Nobrega, K. V. Peinemann, C. P. Borges, Hollow fiber membranes obtained by simultaneous spinning of two polymer solutions: a morphological study, J. Membrane Sci., 226 (2003) 35-50; and H. Strathmann, Membrane separation processes: Current relevance and future opportunities, AIChEJ, 47 (2001) 1077-1087). Ideally, the core layer provides the mechanical strength to withstand high transmembrane pressure difference and has negligible transport resistance for gas separations, while the sheath layer serves as the selective layer, which allows a high separation productivity and efficiency (D. F. Li, T. S. Chung, R. Wang, Y. Liu, Fabrication of fluoropolyimide/polyethersulfone (PES) dual-layer asymmetric hollow fiber membranes for gas separation, J. Membrane Sci., 198 (2002) 211-223). The significantly reduced cost of membrane formation with high separation performance makes dual-layer hollow fiber spinning especially attractive for large scale gas separations that require large membrane areas with high feed pressures (J. Liu, Development of Next Generation Mixed Matrix Hollow Fiber Membranes for Butane Isomer Separation, PhD Dissertation, in: School of Chemical & Biomolecular Engineering, Georgia Institute of Technology, Atlanta, Ga., 2010).

Development of composite hollow fiber membranes dates back to Henne et al, who disclosed a dual-layer composite hollow fiber membrane for hemodialysis (D. F. Li, T. S. Chung, W. Rong, Morphological aspects and structure control of dual-layer asymmetric hollow fiber membranes formed by a simultaneous co-extrusion approach, J. Membrane Sci., 243 (2004) 155-175; and W. Henne, G. Dunweg, W. Schmitz, R. Pohle, F. Lawitzki, Method of producing dialyzing membrane, in, U.S. Pat. No. 4,164,437, 1979). The first set of composite hollow fiber membranes used for gas separations were disclosed by Du Pont in 1992 (D. F. Li, T. S. Chung, R. Wang, Y. Liu, Fabrication of fluoropolyimide/polyethersulfone (PES) dual-layer asymmetric hollow fiber membranes for gas separation, J. Membrane Sci., 198 (2002) 211-223). As for natural gas separations, Jiang et al fabricated Matrimid/polyethersulfone dual-layer hollow fibers with a $CO_2/CH_4$ selectivity around 40 tested with 120~270 psi 40/60 $CO_2/CH_4$ at 22° C. However, the maximum achieved $CO_2$ permeance was only up to 11 GPU (L. Y. Jiang, T. S. Chung, D. F. Li, C. Cao, A. Kulprathipanja, Fabrication of Matrimid/polyethersulfone dual-layer hollow fiber membranes for gas separation, J. Membrane Sci., 240 (2004) 91-103; Li et al distributed PES-zeolite into dual-layer polyethersulfone (PES)/BTDA-TDI/MDI co-polyimide (P84) hollow fiber membranes to enhance $CO_2/CH_4$ selectivity (Y. Li, T. S. Chung, Z. Huang, S. Kulprathipanja, Dual-layer polyethersulfone (PES)/BTDA-TDI/MDI co-polyimide (P84) hollow fiber membranes with a submicron PES-zeolite beta mixed matrix dense-selective layer for gas separation, J. Membrane Sci., 277 (2006) 28-37); however, further heat treatment and additional coating resulted in a $CO_2$ permeance lower than 0.164 GPU and a $CO_2/CH_4$ selectivity below 33.4 tested with 190 psig of 50/50 $CO_2/CH_4$ at 24° C. Besides the lower separation productivity, delamination of sheath/core layers can significantly undermine the mechanical strength under high feed pressures, which has been discussed in fluoropolyimide/polyethersulfone (PES) dual-layer hollow fibers (D. F. Li, T. S. Chung, R. Wang, Y. Liu, Fabrication of fluoropolyimide/polyethersulfone (PES) dual-layer asymmetric hollow fiber membranes for gas separation, J. Membrane Sci., 198 (2002) 211-223). Lower $CO_2$ permeance (membrane separation productivity) indicates that a high-performance polymer material as the selective sheath layer, as well as a robust core layer polymer, is needed to achieve high permeate flux and separation efficacy under aggressive feed conditions.

Liu et al. applied chemical crosslinking modification on polyimide/poly (ether sulfone) dual-layer hollow fibers but the chemical crosslinked hollow fibers tend to plasticize under a $CO_2$ feed pressure ~50 psi (Y. Liu, T. S. Chung, R. Wang, D. F. Li, M. L. Chng, Chemical cross-linking modification of polyimide/poly(ether sulfone) dual-layer hollow-fiber membranes for gas separation, Ind. Eng. Chem. Res., 42 (2003) 1190-1195). Researchers demonstrated that 6FDA-based crosslinkable polyimide hollow fibers showed a $CO_2$ permeance over 50 GPU and a $CO_2/CH_4$ selectivity above 40 tested with 200 psi of 50/50 $CO_2/CH_4$ at 35° C. (I. C. Omole, R. T. Adams, S. J. Miller, W. J. Koros, Effects of $CO_2$ on a High Performance Hollow-Fiber Membrane for Natural Gas Purification, Ind. Eng. Chem. Res., 49 (2010) 4887-4896; I. C. Omole, S. J. Miller, W. J. Koros, Increased molecular weight of a cross-linkable polyimide for spinning plasticization resistant hollow fiber membranes, Macromolecules, 41 (2008) 6367-6375; I. C. Omole, Crosslinked Polyimide Hollow Fiber Membranes for Aggressive Natural Gas Feed Streams, Ph.D. Dissertation, in: Chemical and Biomolecular Engineering, Georgia Institute of Technology, Atlanta, Ga., 2008; I. C. Omole, D. A. Bhandari, S. J. Miller, W. J. Koros, Toluene impurity effects on CO2 separation using a hollow fiber membrane for natural gas, J. Membrane Sci., 369 (2011) 490-498). Despite the good separation performance, the high cost of 6FDA-based crosslinkable polyimide increases cost. Dual-layer hollow fiber spinning technique can be utilized to reduce the amount of expensive polyimide required, while maintaining high separation performance. Despite the attractive aspects of such advanced membranes, it is challenging to integrate a low-cost polymer core layer with the sheath layer to develop crosslinkable composite hollow fibers. A key challenge to overcome in such a membrane is the potential delamination of sheath/core layers and the collapse of the core layer polymer during aggressive heat treatment to crosslink the high performance sheath layer (C. C. Pereira, R. Nobrega, K. V. Peinemann, C. P. Borges, Hollow fiber membranes obtained by simultaneous spinning of two polymer solutions: a morphological study, J. Membrane Sci., 226 (2003) 35-50; and D. F. Li, T. S. Chung, R. Wang, Y. Liu, Fabrication of fluoropolyimide/polyethersulfone (PES) dual-layer asymmetric hollow fiber membranes for gas separation, J. Membrane Sci., 198 (2002) 211-223).

The so-called sorption-diffusion model applies to polymeric gas separation membranes. In this model, the gas permeants first sorb in the upstream of a membrane and then diffuse through the membrane under a partial pressure/fugacity difference. The differences in the amount of gas sorbed in the membrane and the permeant diffusion rate through the membrane cause the gas mixture to be separated. In this case, the permeability of a polymer membrane, P, can be described by the product of the diffusion coefficient, D, and sorption coefficients, S, as shown in Equation 1 (W. J. Koros, G. K. Fleming, Membrane-Based Gas Separation, J. Membrane Sci., 83 (1993) 1-80).

$$P = D \cdot S \qquad (1)$$

The upstream sorption coefficient, S, in glassy polymer membranes can be described well by the so-called dual-mode model, shown in Equation 2 (W. J. Koros, G. K. Fleming, Membrane-Based Gas Separation, J. Membrane Sci., 83 (1993) 1-80).

$$\frac{C_A}{p_A} = S_A = k_{Di} + \frac{C'_{Hi} b_i}{1 + b_A p_A + b_B p_B} \qquad (2)$$

In Equation 2, $k_{Di}$ is the Henry's law constant, $C'_{Hi}$ is the Langmuir capacity constant, $b_i$ is the Langmuir affinity constant, and $p_i$ is the local effective partial pressure of component i, which represents the local chemical potential for component i.

To characterize the separation performance of a hollow fiber membrane, two key factors, termed as permeance and selectivity, can be considered. The permeance, $P_i/l$, represents the separation productivity of a hollow fiber membrane and is defined as the flux of penetrant i normalized by the partial pressure or fugacity difference across the membrane, as shown in Equation 3.

$$\frac{P_i}{l} = \frac{n_i}{\Delta p_i} \qquad (3)$$

In Equation 3, $P_i$ represents the permeability of penetrant i; l describes the effective membrane thickness; $n_i$ represents the flux of penetrant i through the membrane; $\Delta p$ refers the partial pressure or fugacity difference of each penetrant across the membrane. The common unit of permeance is the GPU, which is defined as Equation 4.

$$GPU = 10^{-6}\left(\frac{cc(STP)}{cm^2 \cdot s \cdot cmHg}\right) \quad (4)$$

The selectivity, $\alpha_{ij}$, measures the membrane separation efficacy for a gas pair under conditions where the upstream pressure is much greater than the downstream, as it is in this study. It is defined by the ratio of the fast gas (i) permeance to the slow gas (j) permeance, as shown in Equation 5.

$$\alpha_{ij} = \frac{P_i/l}{P_j/l} \quad (5)$$

As a key challenge for conventional polymeric membranes, the plasticization of polymeric membranes is often observed when an elevated feeding $CO_2$ partial pressure increases the permeance but reduces selectivity significantly. To develop a robust membrane with solid separation performance, the $CO_2$ induced plasticization must be suppressed to achieve a high permeance without loss of selectivity. Past studies have demonstrated that a highly effective approach, ester-crosslinking, can improve the $CO_2/CH_4$ selectivity and $CO_2$ plasticization resistance of a polymer by reducing the degree of swelling and segmental chain mobility in the polymer.

While dual-layer hollow fiber spinning reduces the usage of expensive crosslinkable sheath polymer by up to 90%, crosslinking of composite hollow fibers can cause a delamination of sheath/core layers. Moreover, aggressive heat treatment during crosslinking tends to cause a collapse of core layer polymer and to reduce the permeance significantly.

Achieving a low-cost, defect-free crosslinked composite hollow fiber without delamination, while also exhibiting improved productivity and plasticization resistance, would be of great value to the industry. Such a hollow fiber membrane would find great use economically and effectively in purifying natural gas.

SUMMARY OF THE INVENTION

Disclosed herein is a composite hollow fiber polymer membrane comprising a porous core layer and a selective outer layer on the porous core layer. The porous core layer comprises a polyamide-imide polymer, while the selective outer layer comprises a polyimide polymer prepared from monomers A, B, and C. In another embodiment, the porous core layer comprises a polyetherimide polymer, while the selective outer layer comprises a polyimide polymer prepared from monomers A, B and C. In the polyimide polymer, the monomer A is a dianhydride of the formula

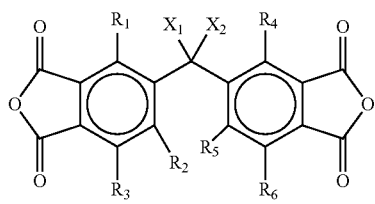

wherein $X_1$ and $X_2$ are independently halogenated alkyl group, phenyl or halogen and $R_1$, $R_2$, $R_3$, $R_4$, $R_5$, and $R_6$ are independently H, alkyl, or halogen. The monomer B is a diamino cyclic compound without a carboxylic acid functionality and the monomer C is a diamino cyclic compound with a carboxylic acid functionality. The polyimide polymer further comprises covalent ester crosslinks.

Also disclosed herein is a method of making a composite hollow fiber polymer membrane. The method comprises providing a porous core layer comprising a polyamide-imide polymer, or a polyetherimide polymer. The method further comprises coating a selective outer layer on the porous core layer. The selective outer layer comprises a polyimide polymer prepared from monomers A, B, and C. The monomer A is a dianhydride of the formula

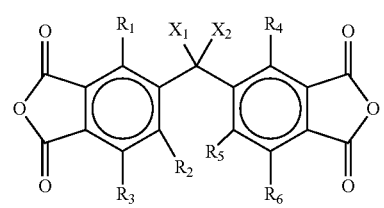

wherein $X_1$ and $X_2$ are independently halogenated alkyl group, phenyl or halogen and $R_1$, $R_2$, $R_3$, $R_4$, $R_5$, and $R_6$ are independently H, alkyl, or halogen. The monomer B is a diamino cyclic compound without a carboxylic acid functionality and the monomer C is a diamino cyclic compound with a carboxylic acid functionality.

Also disclosed herein is a process for purifying natural gas. The process comprises feeding a natural gas stream comprising at least one impurity to at least one membrane unit to provide an impurity-rich permeate and an impurity-depleted product gas stream. The process further comprises recovering the impurity-depleted product gas stream. The at least one membrane unit comprises composite polymer membranes, which comprise a porous core layer and a selective outer layer on the porous core layer. The porous core layer comprises a polyamide-imide polymer, or a polyetherimide polymer, and a selective outer layer comprises a polyimide polymer prepared from monomers A, B, and C. The monomer A is a dianhydride of the formula

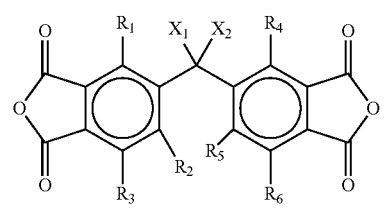

wherein $X_1$ and $X_2$ are independently halogenated alkyl group, phenyl or halogen and $R_1$, $R_2$, $R_3$, $R_4$, $R_5$, and $R_6$ are independently H, alkyl, or halogen. The monomer B is a diamino cyclic compound without a carboxylic acid functionality and the monomer C is a diamino cyclic compound with a carboxylic acid functionality. The polyimide polymer further comprises covalent ester crosslinks.

In one embodiment, high-performance ester-crosslinkable composite hollow fibers are provided through simultaneous spinning of 6FDA-based polyimide and polyamide-imide polymer, e.g., Torlon®, solutions. The core layer polyamide-imide polymer, Torlon®, demonstrates excellent adhesion with crosslinkable 6FDA-based polyimide during spinning, and ester-crosslinking. The polyamide-imide polymer also shows superior thermal stability after crosslinking while maintaining the open substructure of the polyamide-imide polymer core layer. The resultant crosslinked composite hollow fibers show a $CO_2$ permeance of 40 GPU with a $CO_2/CH_4$ selectivity of 39 in testing at 100 psi with 50/50 $CO_2/CH_4$ feed, 35° C. The crosslinked composite hollow fibers also show high separation performance in the presence of high-level hydrocarbon contaminants up to 1000 ppm, demonstrating that the crosslinked composite hollow fibers are viable under realistic operation conditions. The high natural gas separation performance and significantly reduced cost of hollow fiber formation provides a significant advancement in the state of the art for natural gas separations.

In another embodiment, high-performance ester-crosslinkable composite hollow fibers are provided through simultaneous spinning of 6FDA-based polyimide and polyetherimide polymer, e.g., Ultem®, solutions. The polyetherimde has superior thermal stability after crosslinking, and will maintain the open substructure of the core layer. Adhesion to the crosslinkible 6FDA-based polyimide is also good.

Among other factors, therefore, the present invention integrates a low-cost supporting core layer with an expensive crosslinkable sheath layer to achieve defect-free crosslinked composite hollow fibers without sheath/core layer delamination. The resulting composite hollow fiber membranes have the desirable open porous morphology, compatibility of sheath/core layers, and core layer thermal stability during aggressive crosslinking. As well, defect-free ester-crosslinked hollow fiber membranes are provided that exhibit a significantly improved $CO_2$ permeance (productivity) and plasticization resistance.

BRIEF DESCRIPTION OF THE FIGURES OF THE DRAWING

FIG. 9A cold water, ~20° C.; FIG. 9B hot water, ~50° C.

FIG. 10A sheath: core=1:3; FIG. 10B sheath: core=1:6.

FIG. 11A t=0.04 s; FIG. 11B t=0.1 s.

DETAILED DESCRIPTION OF THE INVENTION

Disclosed herein is a composite polymer membrane. A composite polymer membrane is generally made of a thin, selective outer layer of one polymer that is supported by a porous layer of another polymer. The thin, selective outer layer is optimized for a particular gas separation.

Figure 3:
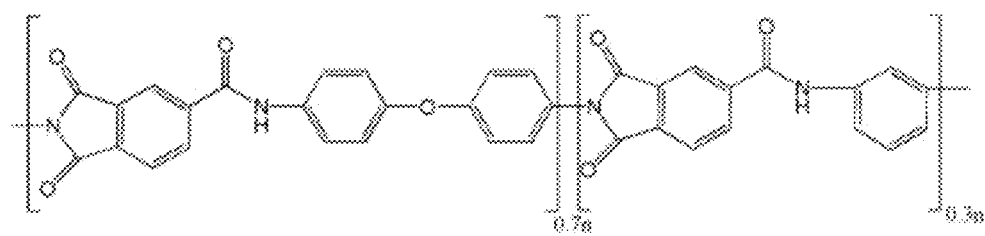
FIG. 3 shows chemical structure of Torlon® polymer, a preferred polyamide-imide polymer, used as a robust core layer material.

In its broadest aspect, the composite polymer membrane disclosed herein comprises a porous substructure or core layer, which comprises a polyamide-imide polymer or a polyetherimide polymer, and a selective outer layer, which comprises a polyimide polymer. In one embodiment, the core layer is a polyamide-imide polymer available under the tradename Torlon®, the structure of which is shown in FIG. 3. In another embodiment, the case layer comprises a polyetherimide polymer, e.g., available under the trade name Ultem®. The polyimide polymer is a 6FDA based polyimide.

Molecular transport across the composite polymer membrane differs between the porous substructure or core layer and the selective outer layer. The pores of the porous core allow low resistance to gas flow but do not contribute to the desired separation. In contrast, molecular transport across the selective outer layer involves solution and diffusion. Molecules dissolve at the upstream side of the selective outer layer, diffuse across the layer, and exit on the downstream side of the layer. Thus, the selective outer layer does not simply function as a filter with pores, like the porous core layer, that separates small molecules from large molecules. Nevertheless, size dependent selectivity is quite important.

The composite polymer membrane with its combination of polyamide-imide polymer and polyimide polymer, e.g., 6FDA based, is advantageous over prior art membranes for several reasons. First, the polyamide-imide polymer and the polyimide polymer interact with one another such that the composite polymer membrane exhibits excellent integrity and is not susceptible to delamination. Use of the polyamide-imide polymer as the core layer also avoids any collapse of the core layer after cross-linking Second, use of the polyimide polymer with the polyamide-imide polymer is advantageous due to the excellent properties of the polyimide polymer for $CO_2$ separation. Third, use of the polyimide polymer with the polyamide-imide polymer is advantageous because the composite polymer membrane is significantly less expensive than a composite polymer membrane where both the porous substructure layer and the selective outer layer are made from the polyimide polymer.

In particular, the present inventors have discovered that the combination of the polyimide polymer and the polyamide-imide polymer is especially suited to form a composite polymer membrane, and in particular a composite hollow fiber membrane, because the polyimide polymer and the polyamide-imide polymer exhibit excellent miscibility so that sheath/core layer delamination is avoided, and the polyamide-imide polymer substructure/core layer thermal stability during aggressive crosslinking avoids any collapse.

In another embodiment, the combination of a polyetherimide polymer and the polyimde polymer is advantageous in a composite polymer membrane. The polyetherimide core polymer with the polyimide sheath polymer of the present invention is quite advantageous over prior art membranes.

Furthermore, as set forth above, use of the polyimide polymer with the polyamide-imide polymer or polyetherimide polymer is advantageous due to the excellent properties of the polyimide polymer for $CO_2$ separation. In particular, the composite polymer membrane exhibits both high $CO_2$ permeability and high $CO_2/CH_4$ selectivity because the polyimide polymer exhibits both high $CO_2$ permeability and high $CO_2/CH_4$ selectivity.

$CO_2$ permeability describes the productivity of the polyimide polymer in enriching $CO_2$ over other components in the feed stream to the selective outer layer. $CO_2$ permeability is the pressure- and thickness-normalized rate of movement of $CO_2$ molecules across a unit area. $CO_2$ permeability is related to $CO_2$ permeance, which is the pressure-normalized rate of movement of $CO_2$ molecules across a unit area. $CO_2$ permeability is ideally constant with feed pressure, flow rate and other process conditions. However, permeability is temperature-dependent. Permeance is also dependent on membrane thickness and permeability. Importantly, the high $CO_2$ permeability or permeance decreases the required membrane area for separation of $CO_2$.

$CO_2/CH_4$ selectivity describes the efficiency of the polyimide polymer in enriching $CO_2$ over $CH_4$ in the feed stream to the selective outer layer. $CO_2/CH_4$ selectivity is equal to the ratio of $CO_2$ permeability to $CH_4$ permeability ($P_{CO2}/P_{CH4}$). Selectivity is ideally constant with feed pressure, flow rate and other process conditions. However, selectivity is temperature-dependent. Importantly, the high $CO_2/CH_4$ selectivity minimizes the loss of methane, a valuable product in natural gas production, to the permeate (i.e., waste) stream.

Moreover, use of the polyimide polymer with the polyamide-imide polymer or polyetherimide polymer is advantageous because the composite polymer membrane is significantly less expensive than a composite polymer membrane where both the porous substructure/core layer and the selective outer layer are made from the polyimide polymer. The polyamide-imide polymer and polyetherimide polymer are inexpensive relative to the polyimide polymer. Additionally, the sheath outer layer requires a significantly smaller amount of polymer than the porous core layer. For example, with the composite polymer membrane in the form of a dual layer hollow fiber membrane, the amount of polyimide polymer in the sheath outer layer comprises about $\frac{1}{10}^{th}$ by volume of the amount of polyimide polymer that would be employed in a dual layer hollow fiber membrane comprising both a selective sheath outer layer and a porous core layer made of polyimide polymer. Thus, the relative expense of the polyamide-imide polymer or polyetherimide polymer and the fact that the porous core layer requires significantly more polymer than the selective outer layer both contribute to the relatively lower cost of the composite polymer membrane.

Consequently, the composite polymer membrane can effectively and efficiently separate $CO_2$ from $CH_4$ in natural gas with a relatively inexpensive capital cost.

The polyimide polymer is prepared from three monomers, referred to herein as A, B, and C. The polyimide polymer is also crosslinked and, therefore, comprises covalent ester crosslinks.

The monomer A is a dianhydride of the formula:

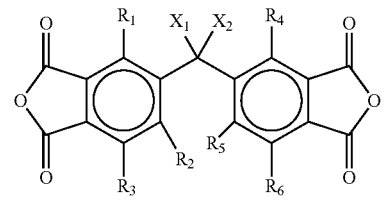

wherein $X_1$ and $X_2$ are independently halogenated alkyl group, phenyl or halogen; and $R_1$, $R_2$, $R_3$, $R_4$, $R_5$, and $R_6$ are independently H, alkyl, or halogen.

The monomer A can be 4,4'-(hexafluoroisopropylidene) diphthalic anhydride (6FDA), which is also known as (2,2,-bis(3,4-dicarboxylphenyl)hexafluoropropane. 6FDA has the following structure:

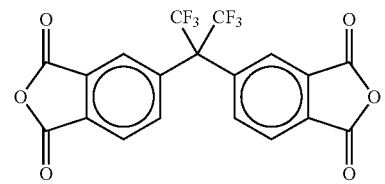

Including 6FDA in the monomers provides stability to the polyimide polymer because 6FDA has limited rotational ability.

Monomers with limited rotational ability, like 6FDA are desirable because they increase the selectivity of the membrane. Monomers with bulky side groups, like $(CF_3)_2$ in 6FDA, also inhibit chain packing, which increases permeability of molecules through the membrane. As discussed above, both selectivity and permeability are important for efficient and productive separations. Further reference to these structure property relationships can be found in Koros and Fleming, *Journal of Membrane Science*, 83, 1-80 (1993), herein incorporated by reference in its entirety.

The monomer B is a diamino cyclic compound without a carboxylic acid functionality. It can be a diamino aromatic compound with more than one aromatic ring where the amino groups are on the same or different aromatic ring. For example, the monomer B can be 4,4' isopropylidene dianiline, 3,3' hexafluoroisopropylidene dianiline, 4,4' hexafluoroisopropyliene dianiline, 4,4' oxydianiline, 3,3' oxydianiline, 4,4' diaminodiphenyl, diaminotoluene, diaminobenzotrifluoride, dimethyldiaminobenzene, trimethyldiaminobenzene, or tetramethyldiaminobenzene. The monomer B can also be 2,4,6-trimethyl-m-phenylenediamine (DAM), which is represented by the following structure:

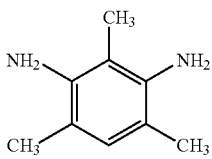

The monomer C is a diamino cyclic compound with a carboxylic acid functionality. It can be diamino benzoic acid, which is represented by the following structure:

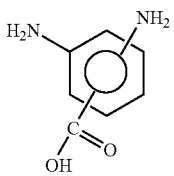

More specifically, the monomer C can be 3,5-diaminobenzoic acid (DABA).

The ratio of B to C can vary. The ratio of B to C can be between 1:4 and 8:1. Alternatively, the ratio of B to C can be between 17:3 and 3:2. As another alternative, the ratio of B to C can be between 17:3 and 3:1. As yet another alternative, the ratio of B to C can be between 4:1 and 3:2.

In one embodiment, the monomer A is 6FDA, the monomer B is DAM, and the monomer C is DABA. In this embodiment, the 6FDA content of the monomer mixture is about 50 percent and the remaining about 50 percent of the monomer mixture is composed of DAM and DABA. The DABA content is between about 20 percent and about 100 percent of the remaining about 50 percent. For example, the 6FDA content of the monomer mixture can be about 50 percent and the remaining 50 percent can be about 40 percent DABA and about 60 percent DAM. When 6FDA, DAM, and DABA are present in these stoichiometric concentrations, the resulting polyimide polymer prior to crosslinking to form the covalent ester crosslinks is represented by the structure:

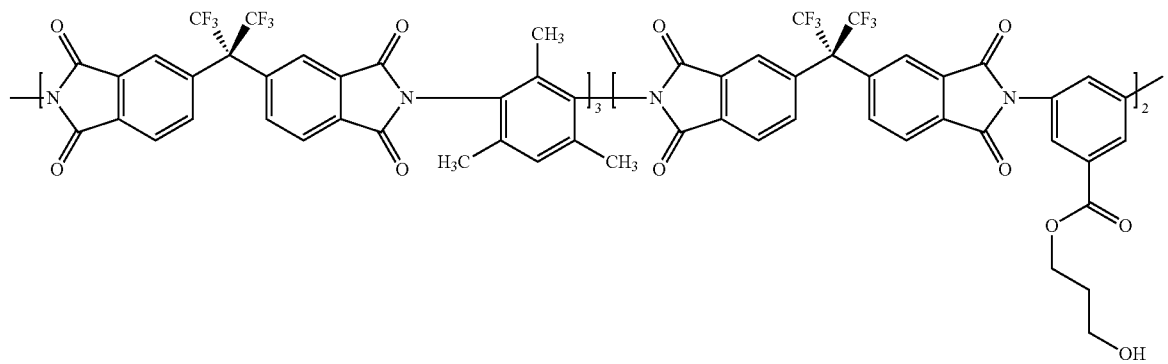

In this structure, the ratio of DAM:DABA is 3:2.

The polyimide polymer can have a $CO_2$ permeance of at least 20 GPU and a $CO_2/CH_4$ selectivity of greater than 20, at 35° C. and a feed pressure of 100 psia. In one embodiment, the $CO_2$ permeance can be at least 25 GPU and the $CO_2/CH_4$ selectivity can be greater than 25, at 35° C. and a feed pressure of 100 psia. In another embodiment, the $CO_2$ permeance can be at least 25 GPU and the $CO_2/CH_4$ selectivity can be greater than 30, at 35° C. and a feed pressure of 100 psia. When the crosslinked polyimide polymer is prepared from the monomers 6FDA, DAM, and DABA with a DAM:DABA ratio of 3:2, the polyimide polymer can have a $CO_2/CH_4$ selectivity of about 38 and a $CO_2$ permeability of about 58 Barrer.

The polyimide polymer can have a ratio of crosslinkable sites to imide groups of between 3:8 and 1:16.

Suitable polyimide polymers are described in U.S. Pat. Nos. 6,932,859 and 7,247,191 and U.S. patent application Ser. Nos. 12/007,466 and 12/007,467. Such documents are incorporated by reference in their entirety herein.

The polymer core or substructure layer can be any suitable polymer compatible with the polyimide layer, particularly, the 6FDA based polymer. A polyamide-imide polymer such as that available under the tradename Torlon® is preferred. In another embodiment, the core polymer comprises a polyetherimide polymer, such as that available under the trademark Ultem®.

The composite polymer membrane may be in any form known in the art, for example, hollow fibers, tubular shapes, and other membrane shapes. Hollow fibers are especially desirable for natural gas separations. This is especially important for offshore applications. Other membrane shapes include spiral wound membranes, pleated membranes, flat sheet membranes, and polygonal membranes. In one embodiment, the composite polymer membrane is a dual layer hollow fiber membrane.

However, the composite polymer membrane disclosed herein may incorporate more layers than the porous substructure or core layer and the selective outer sheath layer. These additional layers may contain the materials employed in the porous substructure layer and the selective outer layer or may contain other materials.

Figure 4:
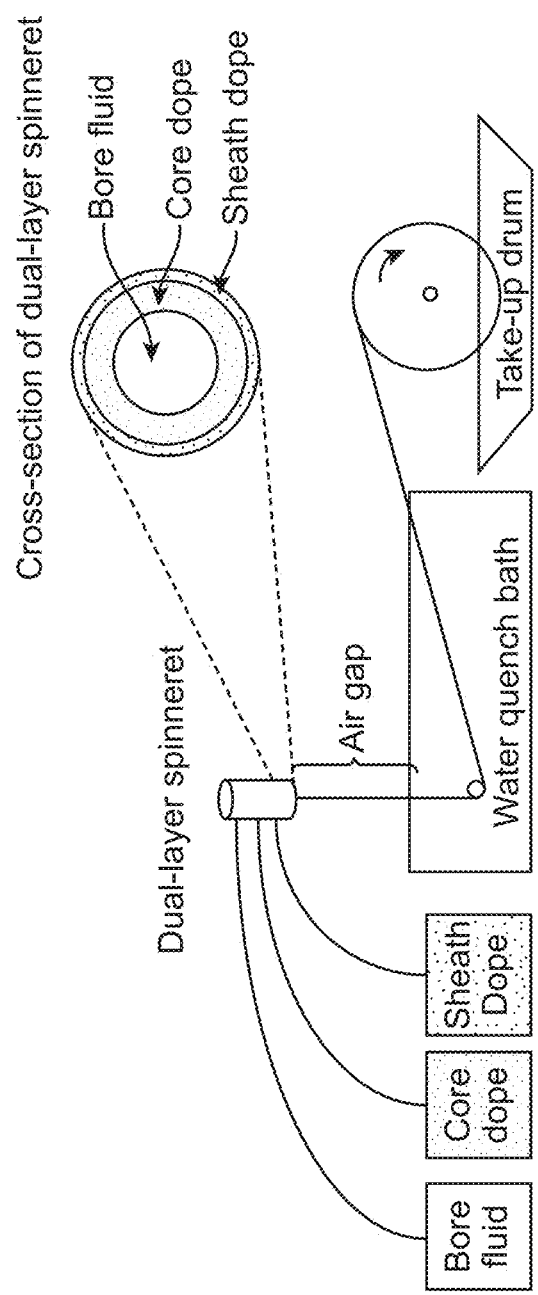
FIG. 4 shows dry-jet/wet-quench dual-layer spinning to form composite hollow fiber membranes.

Composite hollow fiber membranes can be produced through the so-called dry-jet/wet-quench hollow fiber spinning process. This is shown in FIG. 4, for example. Two homogeneous polymer solutions, called sheath dope and core dope, are simultaneously extruded with bore fluid through an annular die, called a dual-layer spinneret, into an aqueous quench bath. During the dry jet step, the evaporation of volatile components in the sheath dope will increase the local polymer concentration of the outermost layer of nascent fibers and result in the formation of a skin layer in the sheath layer. When the nascent fiber enters the aqueous quench bath, solvents diffuse from fibers into the quench bath while water from the quench bath diffuses into the fibers, which causes phase separation to occur. Open porous substructures in both core layer and sheath layer can be formed during this phase separation process. A simple subsequent standard process to prepare hollow fiber modules, as is known in the industry, can then be used.

In one embodiment, high-performance ester-crosslinkable composite hollow fibers are provided through simultaneous spinning of 6FDA-based polyimide and polyamide-imide polymers e.g., Torlon® solutions. The core layer polyamide-imide polymer, Torlon®, demonstrates excellent adhesion with the crosslinkable 6FDA-based polyimide during spinning, and during ester-crosslinking. The polyamide-imide polymer, e.g., Torlon®, also shows superior thermal stability after crosslinking while maintaining the open substructure of the polyamide-imide polymer core layer.

In one embodiment, high-performance composite hollow fibers are provided through simultaneously spinning of 6FDA-based polyimide and a polyetherimide polymer, e.g., Ultem®, solution.

Figure 1:
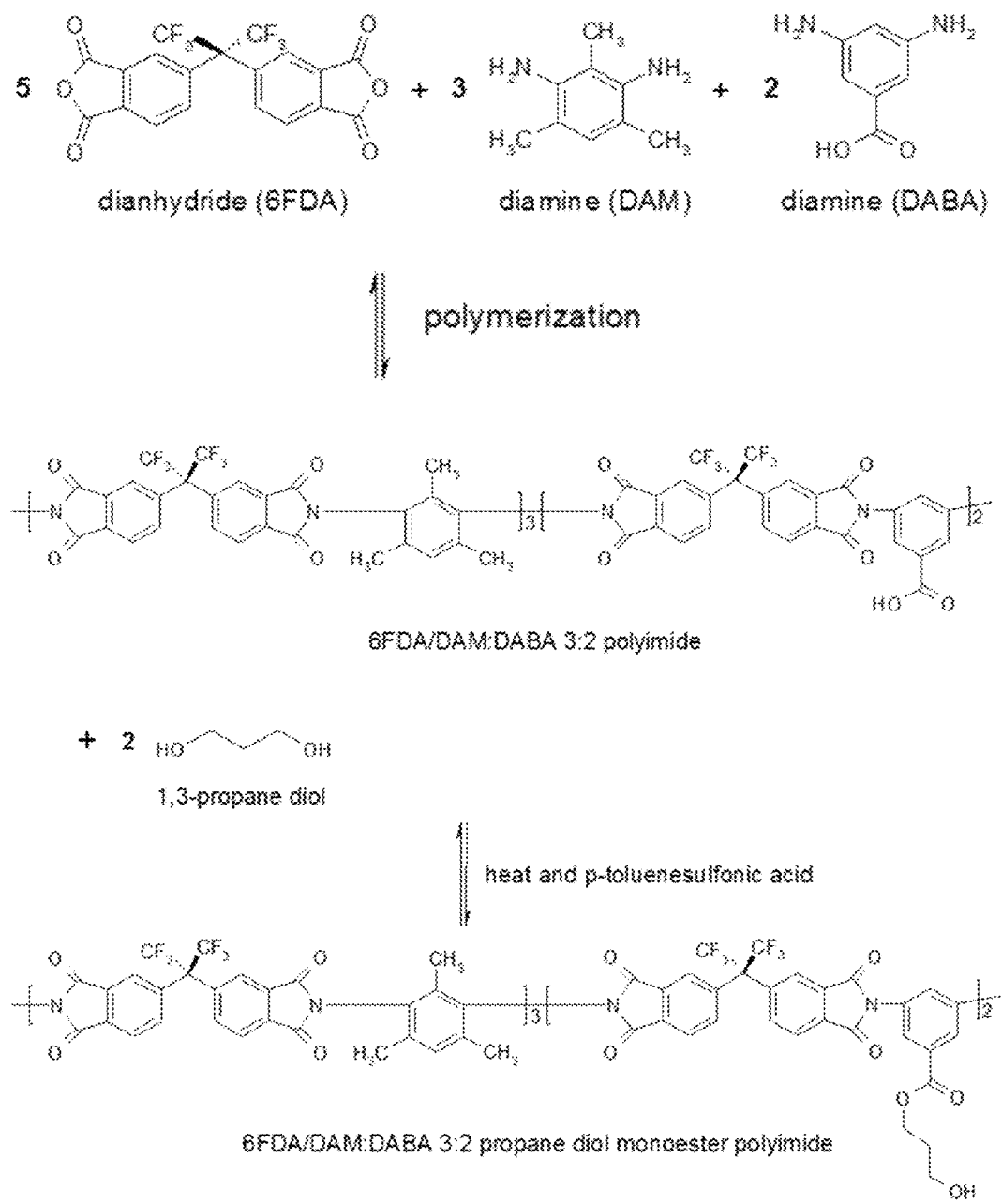
FIG. 1 shows the polymerization and monoesterification reaction to synthesize PDMC polyimide.
Figure 2:
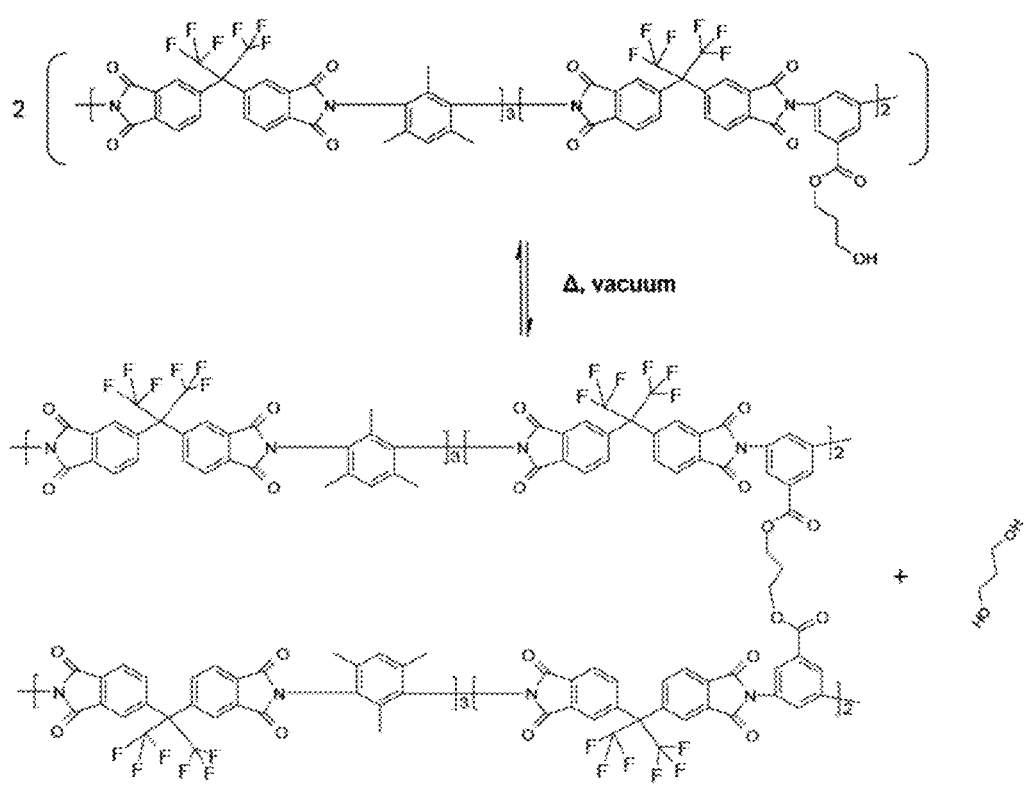
FIG. 2 shows an ester-crosslinking mechanism to produce the crosslinked polyimide.

In the foregoing embodiments, the crosslinkable sheath layer polyimide is a 6FDA based polyimide. The molecular weight and PDI for this sheath layer polymer is 74 000 (Mw) and 2.8, respectively. The PDMC is produced by monoesterification of a polyimide copolymer, 6FDA/DAM:DABA (3:2), with 1,3-propanediol. The 6FDA/DAM:DABA (3:2) polymer is synthesized from 4,4'-(hexafluoroisopropylidene)diphthalic anhydride (6FDA), 2,4,6-trimethyl-1,3-diaminobenzene (DAM) and 3,5-diaminobenzoic acid (DABA) as known in the prior art. The selection of crosslinking agent, 1,3-propanediol, is primarily based on performance. The carboxylic acid groups in DABA groups can react with ester groups to form new ester bonds and interconnect the polymer matrix; this so-called crosslinking process can stabilize the polymer against plasticization. The synthesis of 6FDA/DAM:DABA (3:2), monoesterification and crosslinking reaction are shown in FIGS. 1 and 2.

In general, the selection of a core layer material is challenging due to the complexity of composite hollow fiber formation and the further crosslinking required after the spinning process, which may cause sheath/core layer delamination or core layer collapse of composite hollow fibers. Cellulose acetate is compatible with 6FDA-DAM:DABA (3:2), however, subsequent crosslinking can cause serious collapse of the cellulose acetate and reduce the permeance significantly due to the lower glass transition temperature (Tg) of cellulose acetate. A polyamide-imide copolymer, such as Torlon®, has been found suitable. It can be co-spun with the polyimide polymer as the supporting core layer polymer to provide desirable morphology, thermal stability and high separation performance. The structure of Torlon® is shown in FIG. 3. A polyetherimide polymer, such as Ultem®, has also been found suitable, and can be co-spun with the polyimide polymer as the supporting core layer to provide high performance composite hollow fibers.

The spinning dope consists of polymer, solvents and non-solvents and should be a homogenous solution. Solvents dissolve polymers to produce polymer solutions for spinning and non-solvent move the dope composition towards to the binodal to allow rapid phase separation. N-methylpyrrolidone (NMP) can dissolve both PDMC and Torlon® and serves as the primary solvent to for both the sheath dope and core dope. Besides NMP, tetrahydrofuran (THF) is used as a secondary solvent in the sheath dope to promote the formation of a skin layer in the outermost sheath layer. Typical non-solvents, including water and ethanol, are chosen in this work due to their relatively low toxicity and easy processing. Polyvinylpyrrolidone (PVP) or lithium nitrate ($LiNO_3$) was also added in dopes in this work as "pore former", which can help form desirable open porous substructures in composite hollow fibers. To develop a spinnable dope, a ternary phase diagram, containing the binodal curve, should be constructed to ensure that the dope composition is not only located in the one-phase region but also is close to the binodal to allow rapid phase separation. The dope compositions must also not be too close or cross the binodal, which may cause defects or eliminate the skin layer. A straightforward technique to determine the approximate binodal location is provided by the so-called "cloud point determination", as is known in the art.

After the dope development, the sheath dope and core dope are co-extruded with bore fluid through a dual-layer spinneret. As discussed above, the skin layer is formed in the outermost layer of a fiber during the dry jet process. The nascent composite fiber then enters the aqueous quench bath and phase separation occurs immediately. The hollow fibers are collected on a rotating drum and soaked in water bath for ~3 days to remove residual solvents and non-solvents in the fibers. Typically, if the wet fibers are dried directly, capillary force in the fibers induced by dehydration can collapse the pores and even damage the fiber selective layer. To control the morphology, solvent exchange is conducted to remove water from the fibers, which is particularly important for preserving the transition layers of composite hollow fibers. A typical solvent exchange consists of two steps: first soak the fibers in ethanol or methanol to remove water from fibers, and then use hexane to replace the residual ethanol or methanol in fibers. After solvent exchange, the fiber surface tension is significantly reduced and the fibers can be further dried under vacuum or heating without collapsing the pores of fibers or damaging the defect-free selective layer.

The crosslinking reaction is conducted by annealing fibers in a pre-heated vacuum oven at a constant temperature for a set period of time. The crosslinking temperature is important in developing delamination-free composite hollow fibers without collapsing the core layer. A crosslinking temperature higher than glass transition temperature of the core layer polymer will tend to collapse the core layer and reduce the permeance significantly. On the contrary, an excessively low crosslinking temperature may not be able to stabilize hollow fibers against $CO_2$ plasticization due to a lower degree of crosslinking Generally, it has been found that a crosslinking temperature of about 200° C. and a crosslinking time about 2 hours is appropriate for crosslinked monolithic hollow fibers. Since the Torlon® is insoluble in THF, it is relatively difficult to characterize the crosslinkability of polyimide/Torlon® composite hollow fibers by using a THF dissolution experiment. Nevertheless, the polyimide sheath layer of composite hollow fibers is believed to be crosslinked since the 200° C., 2 hours crosslinked monolithic hollow fibers spun from the same batch polyimide as composite is insoluble in THF. Good resistance to plasticization is achieved through the crosslinked structure.

Hollow Fiber Membrane Characterization

Scanning Electron Microscope (SEM) can be used to observe the cross-section of asymmetric hollow fibers. To prepare a fiber sample for SEM test, the fibers are cryogenically fractured in liquid nitrogen to preserve their cross-section structure. Since the polymeric fibers are non-conductive, the cross-section of fibers must be coated with a gold layer for the SEM measurement. SEM images are particularly important to characterize the adhesion of sheath/core layers for composite hollow fibers. In fact, the cryogenic fracturing itself is a demanding test of adhesion. SEM images of an uncrosslinked polyimide/Torlon® composite hollow fiber spun from this work are shown in FIG. 5.

Figure 5:
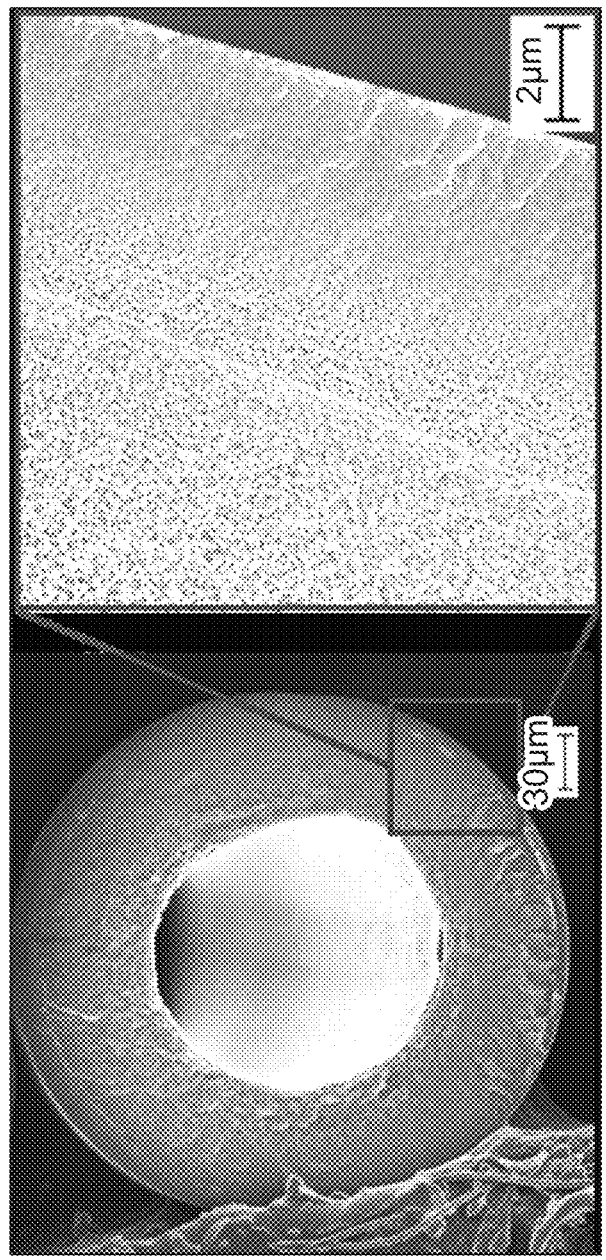
FIG. 5 shows scanning electron micrographs of the cross section of an uncrosslinked PDMC/Torlon® hollow fiber, showing the dense skin layer, sheath layer, core layer and the porous substructure.

FIG. 5 shows that Torlon® is compatible with PDMC as there is no delamination of sheath/core layer in the fibers during spinning. The open porous substructures are apparent in both the sheath and core layer. The composite hollow fibers after crosslinking were also checked by SEM, as shown in FIG. 6.

Figure 6:
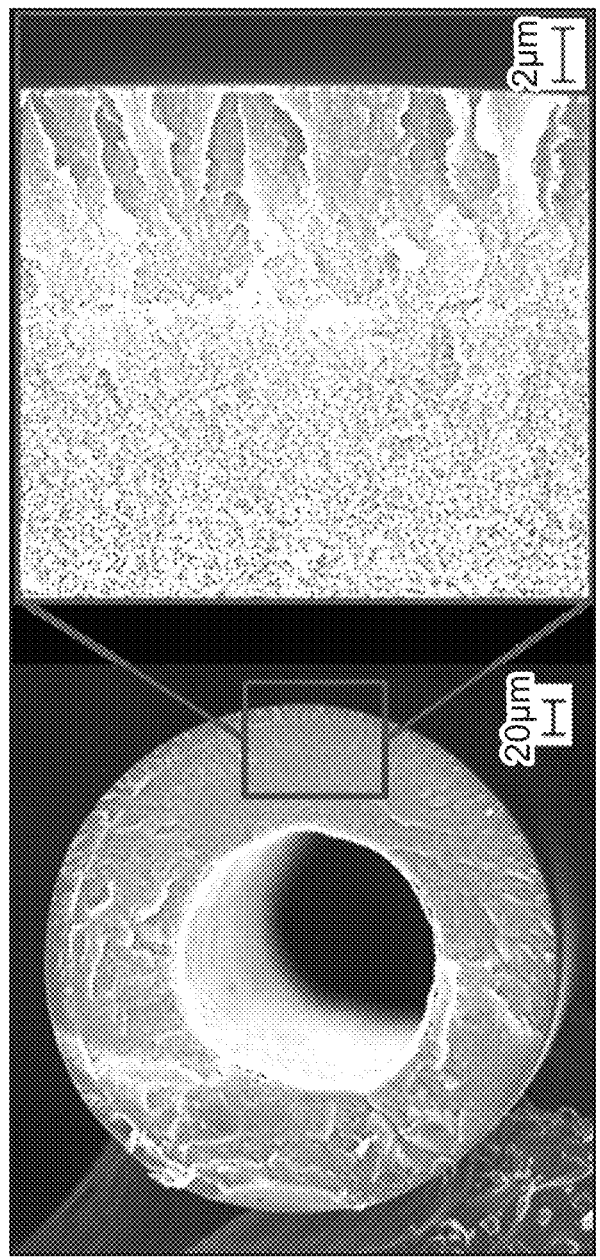
FIG. 6 shows scanning electron micrographs of the cross section of a crosslinked PDMC/Torlon® hollow fiber, showing the dense skin layer, sheath layer, core layer and the porous substructure.

FIG. 6 shows that the Torlon® core layer demonstrates good adhesion with the sheath layer after crosslinking, suggesting the crosslinking does not cause delamination of core layer and sheath layer. Moreover, the open porous substructure of Torlon® core layer did not collapse during crosslinking, showing that the Torlon® core layer has desirably strong thermal stability. The morphologies shown in the SEM images suggest that Torlon® provides the desirable open porous morphology, compatibility with PDMC and thermal stability after crosslinking.

The natural gas separation performance of hollow fibers is typically studied by using mixed gas permeation to simulate the realistic gas feed compositions. Compared to pure gas permeation, mixed gas permeation can probe the separation performance of membrane in the presence of both plasticization and competition effects. Both bore-fed and shell-fed can be used for gas permeation; however, the shell-fed system is preferred since shell-fed modules can overcome the concentration polarization in the feed if mixed gas feeding is at a low stage cut (<0.1%). Moreover, in actual applications for high pressure feeds, shell side feed flow is preferred in the event of a fiber failure, which simply results in collapse and fiber shutdown. The stage cut is defined by the ratio of the permeate rate to feed flow rate. In mixed gas permeation, the retentate flow rate is determined by the permeate rate to meet a stage cut of less than 1% to completely avoid the concentration polarization in the feed.

As discussed above, the ternary phase diagrams are used to prepare spinnable sheath dope and core dope. A common and effective method to determine the binodal is through the cloud point technique. The results of cloud point experiments are summarized and plotted in ternary phase diagrams for both PDMC and Torlon®, shown in FIGS. 7 and 8.

Figure 7:
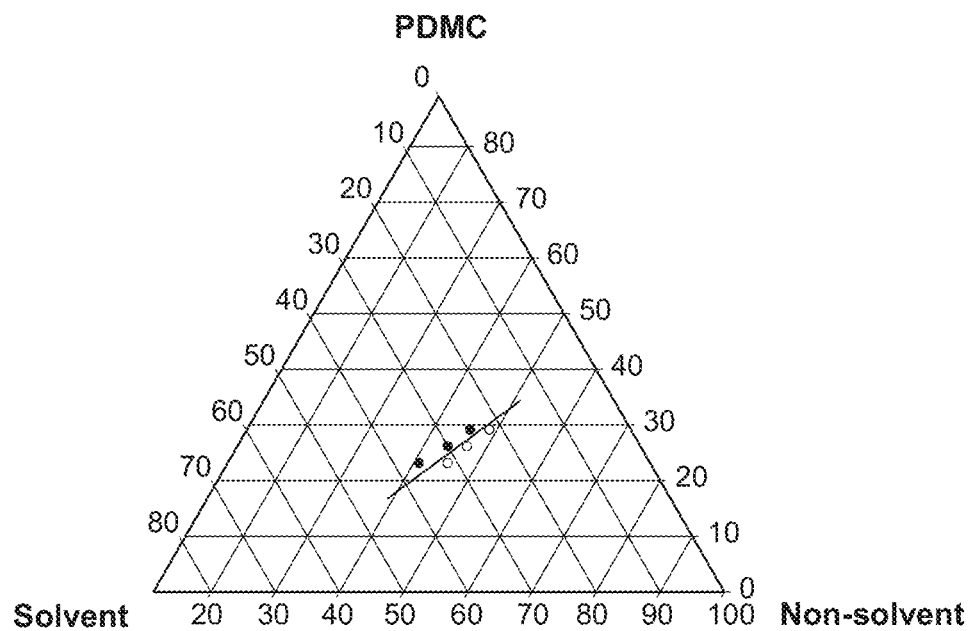
FIG. 7 shows ternary phase diagram showing the binodal (black solid line) of PDMC polymer/solvent/non-solvent system. Solid points and open circles represent one-phase dope and two-phase dope, respectively.
Figure 8:
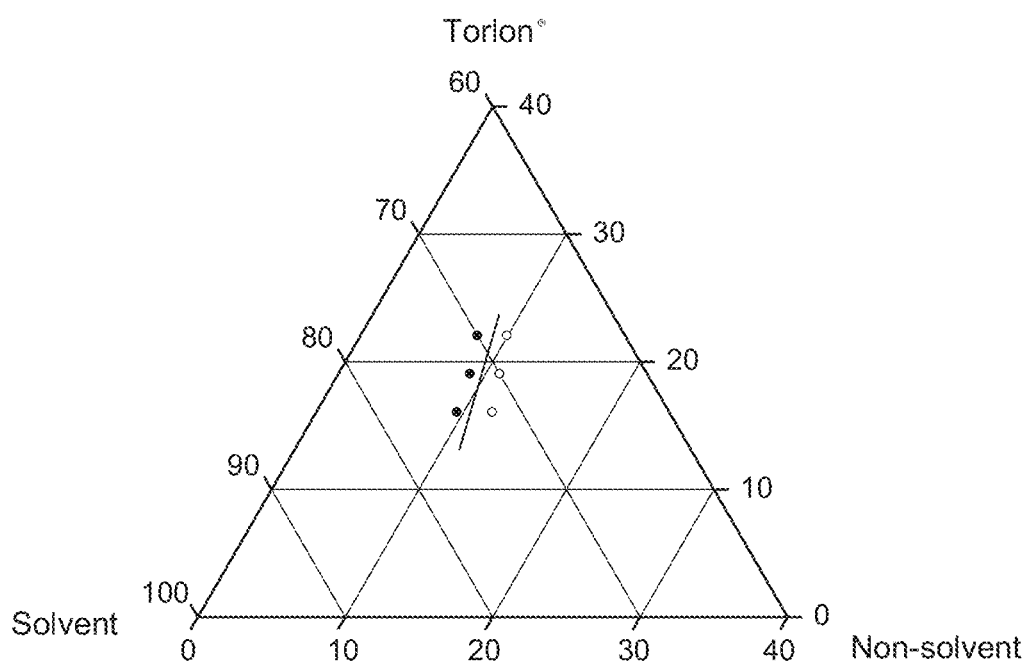
FIG. 8 shows ternary phase diagram showing the binodal (black solid line) of Torlon®/solvent/non-solvent system. Solid points and open circles represent one-phase dope and two-phase dope, respectively.

In FIGS. 7 and 8, the solid points represent the one-phase samples and open circles represent the two-phase samples for the PDMC or Torlon® solution system. The binodal (shown as black solid line) lies between the one-phase region and two-phase region. After the construction of ternary phase diagrams, the dope composition for the hollow fiber spinning are chosen near the binodal to allow both rapid phase separation and high separation productivity.

Composite Hollow Fiber Development

Based on the ternary phase diagrams developed and the successful single-layer hollow spinning on PDMC, the dope was determined and made to consist of 30.5% polymer, 30.5% NMP, 19.46% Ethanol, 13.04% THF and 6.5% LiNO$_3$. This same dope was used for the sheath layer, and the core layer was adjusted for compatibility to arrive at the composition as noted in Table 1. The spinning conditions for the composite hollow fiber spinning are summarized in Table 1.

TABLE 1

Composite hollow fiber spinning conditions

Dual-layer hollow spinning condition

| | |
|---|---|
| Core dope composition (Torlon ®/NMP/H$_2$O/PVP) | 16.0%/74.4%/5.6%/4.0% |
| Sheath dope extrusion rate | 30~60 ml/hr |

TABLE 1-continued

Composite hollow fiber spinning conditions

Dual-layer hollow spinning condition

| | |
|---|---|
| Core dope extrusion rate | 180 ml/hr |
| Bore fluid composition | NMP/H$_2$O 80/20 wt % |
| Bore fluid rate | 60 ml/hr |
| Spinneret temperature | 50~70° C. |
| Air gap | 1~15 cm |
| Quench bath | 20~50° C. |
| Take-up rate | 10~50 m/min |

The complex nature of polymer solutions and sheath/core layer interface, together with aggressive crosslinking, for the composite hollow fiber spinning requires some trial and error to develop the desirable defect-free and delamination-free crosslinked composite hollow fibers. In this regard, composite hollow fibers spun from various spinning conditions were first characterized by using SEM to probe the optimum spinning process variables, as shown in Table 1. Three main spinning factors were examined: quench bath temperature, sheath to dope flow rate ratio and air gap residence time, as discussed below.

For monolithic hollow fiber spinning, a higher quench bath temperature (say 50° C.) can accelerate the phase separation and promote the formation of open porous substructure. However, due to the complicated interface interaction of sheath/core layers, a higher quench bath temperature may cause delamination of sheath/core layers. Therefore, in this work, both cold water (FIG. 9A) and hot water (FIG. 9B) quench baths were considered and SEM images of the resultant composite hollow fibers are shown in FIGS. 9A and B.

Figure 9A:
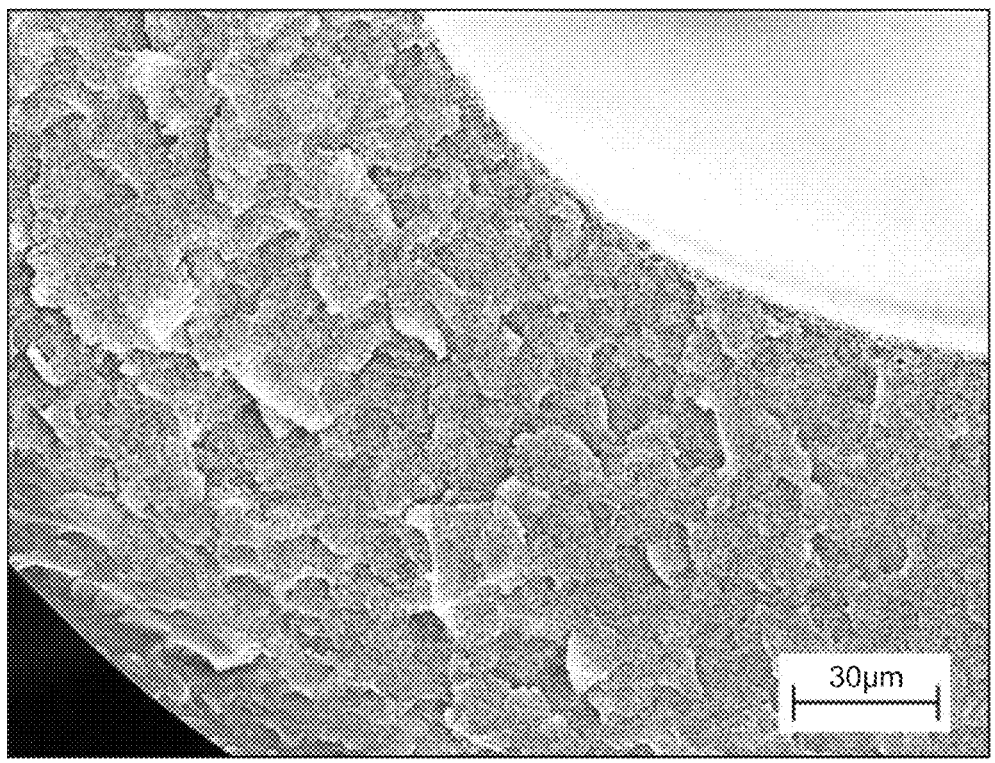
FIGS. 9A and 9B show SEM images showing uncrosslinked PDMC/Torlon® composite hollow fiber samples spun at different quench bath temperatures.
Figure 9B:
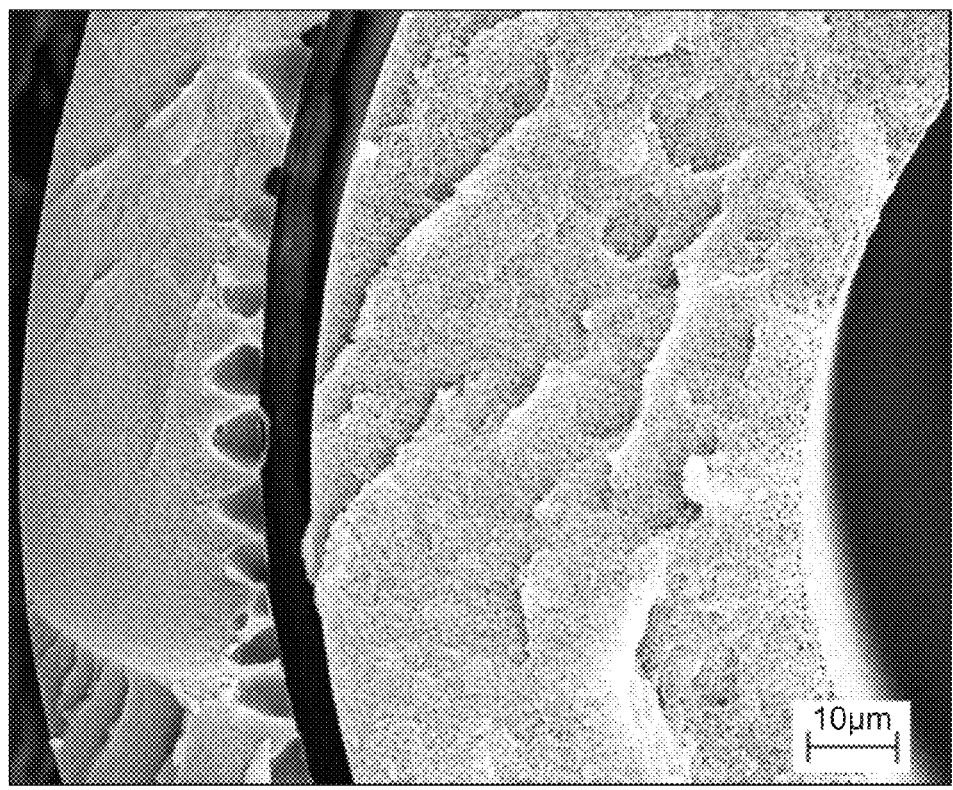

FIG. 9B shows that the hot quench bath temperature of 50° C. can cause a serious delamination of sheath/core layers while FIG. 9A shows that the cold water quench bath (20° C.) produces delamination-free composite hollow fibers. A lower temperature can reduce the diffusion rate of solvents and non-solvents between nascent fibers and quench bath during the wet-quench process. This will increase the contact time of sheath dope and core dope before phase separation occurs. Since a longer "interdiffusion" time of polymer chains is hypothesized to lead to a better adhesion, a lower quench temperature is preferred to develop delamination-free composite hollow fibers. However, the quench bath temperature should be controlled carefully since an excessively low temperature may cause inadequate phase separation of nascent fibers before reaching the guide roller in the quench bath. This may produce undesirable oval hollow fibers or cause substructure resistance, which is formed during the phase separation process.

The effect of sheath dope flow rate was also studied as it determines the amount of expensive PDMC used for dual-layer spinning. A sheath to core dope flow rate ratio of 1:3 (FIG. 10A) and 1:6 (FIG. 10B) were studied. The SEM images of composite hollow fibers spun from these two different sheath/core dope flow ratios are shown in FIGS. 10A and B.

Figure 10A:
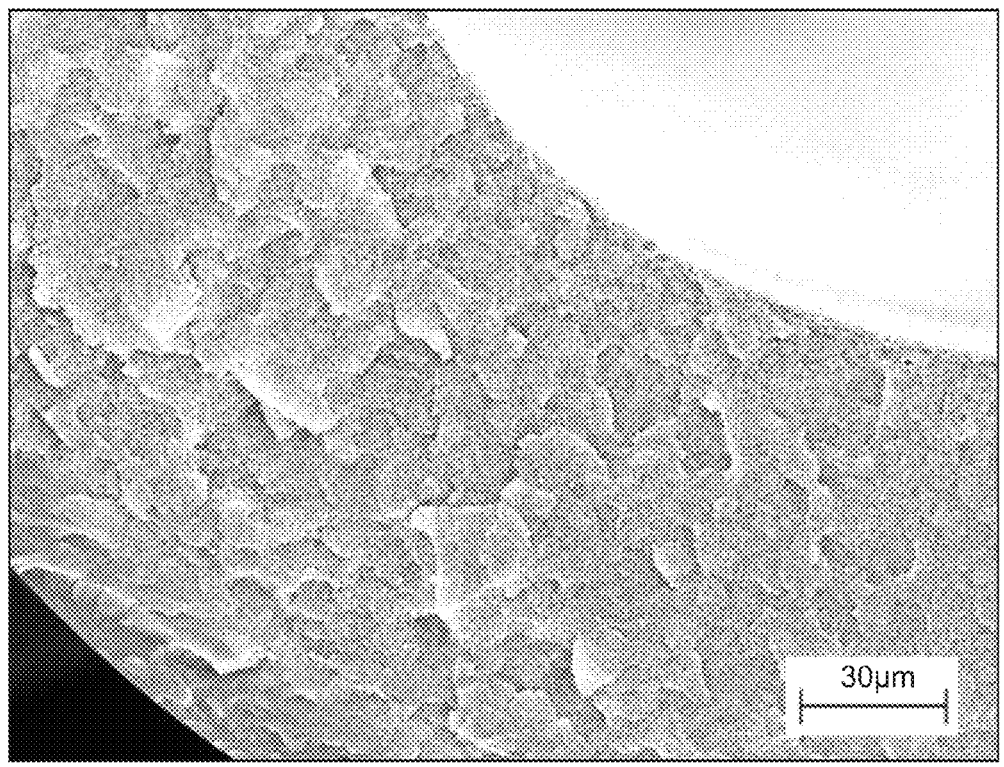
FIGS. 10A and 10B show SEM images showing uncrosslinked PDMC/Torlon® composite hollow fibers spun at different sheath/core dope flow rate ratios at a quench bath temperature of 20° C.
Figure 10B:
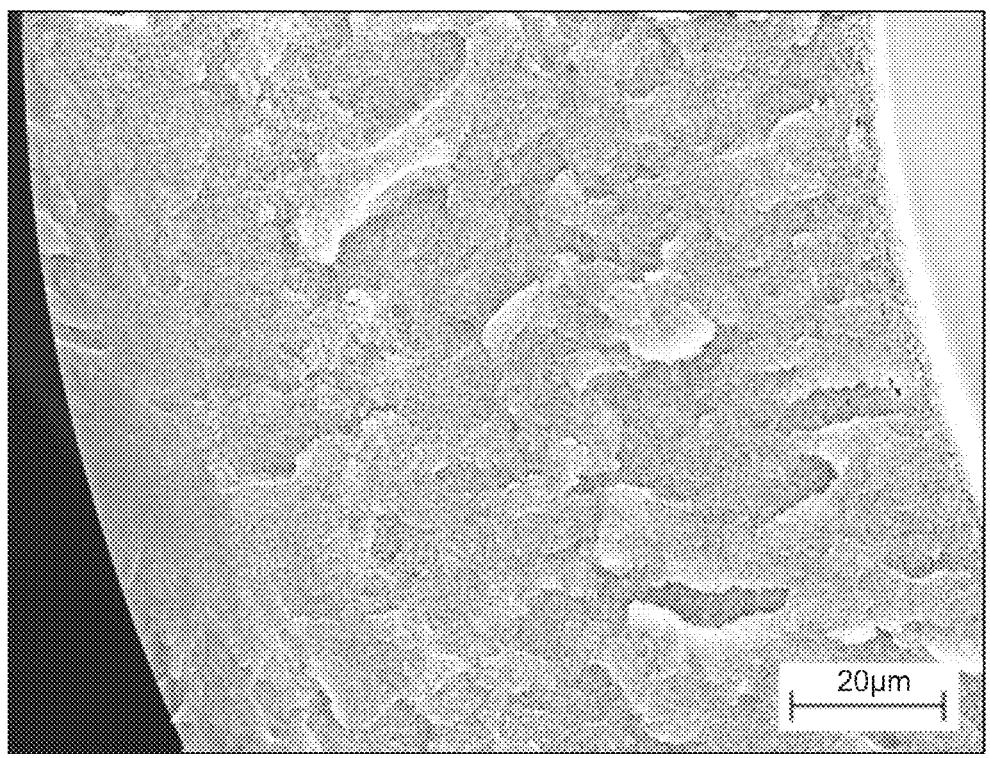

As shown in FIGS. 10A and B, the PDMC sheath layers are adhered well with the Torlon® core layers at those sheath/core dope flow rate ratios (1:3 (FIG. 10A) and 1:6 (FIG. 10B)). Moreover, open porous substructures are apparent in both of those composite hollow fibers, suggesting phase separation occurs rapidly. However, preliminary permeation showed that the lower dope flow ratio of 1:6 could produce composite hollow fibers with skin defects.

This is possibly due to inadequate THF evaporation when reducing the sheath dope flow rate from 60 ml/hr to 30 ml/hr. It is believed that the evaporation of THF moves the dope composition towards the vitrified region during the air gap period. However, the local polymer concentration in the outmost layer of a nascent fiber may be insufficient to produce a defect-free skin from the lower sheath dope flow rate. Therefore, the 1:3 dope flow ratio is preferred to produce both delamination-free and defect-free composite hollow fiber membranes.

The air gap residence time has been identified as a key factor in determining the skin layer formation and gas separation performance. Studies on Matrimid® hollow fibers showed that a lower air gap residence time can reduce the skin layer thickness and improve the gas separation permeance. Therefore, the effect of air gap residence time was also explored to produce productive composite hollow fibers. The air gap residence time, t, is determined by the ratio of air gap height to the take-up rate. SEM images of composite hollow fiber spun at different air gas residence times are shown in FIGS. 11A and B.

Figure 11A:
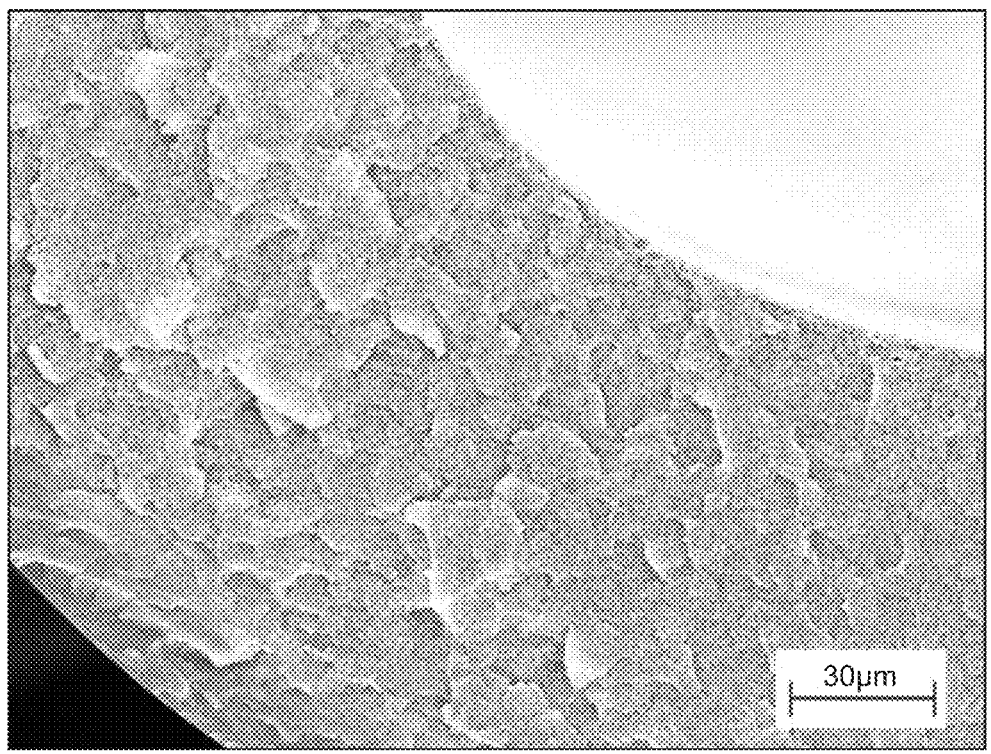
FIGS. 11A and 11B show SEM images showing uncrosslinked PDMC/Torlon® composite hollow fibers spun at different air gas residence time, t, at a quench bath temperature of 20° C.
Figure 11B:
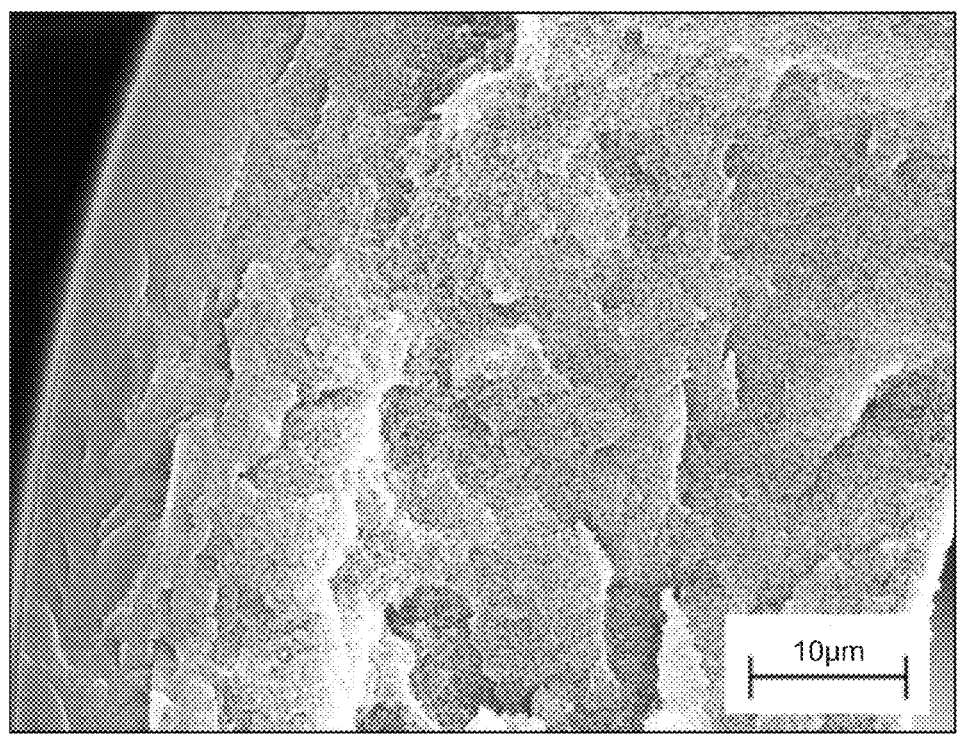

FIGS. 11A and B show that composite hollow fibers show good adhesion of sheath/core layers at an air gap residence time from 0.04~0.1 s (FIG. 11A t=0.04 s and FIG. 11B t=0.1 s). A longer air gap residence time can produce hollow fibers with a relatively smaller dimension and increase the adhesion since the "interdiffusion" time of polymer chains is increased; however, it may also cause a relatively thicker skin layer and reduce the gas permeance (separation productivity). Therefore, an air gap residence time lower than 0.04 s is preferred to produce thin-skinned and high-performance composite hollow fibers. Other air gaps can be used as needed for different polymers and dope compositions.

Further ester-crosslinking and gas permeation was performed on some of the best spinning states. The composite hollow fibers were crosslinked by annealing the fibers at 200° C. for 2 hours under vacuum and mixed gas permeation was then conducted, as discussed in sections below.

Natural Gas Separation Performance

Figure 12:
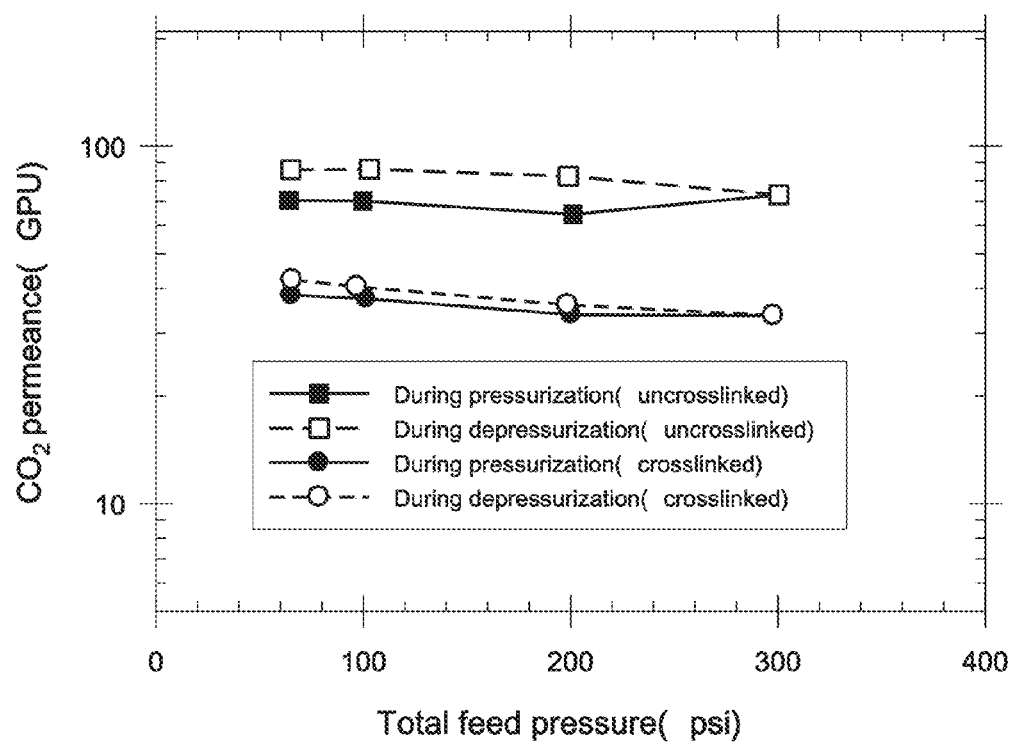
FIG. 12 shows $CO_2$ permeance of uncrosslinked and crosslinked PDMC/Torlon® composite hollow fiber membranes at elevated feed pressures in this work. Permeances calculated by using fugacity. Test conditions: 50/50 $CO_2/CH_4$, at 35° C.
Figure 13:
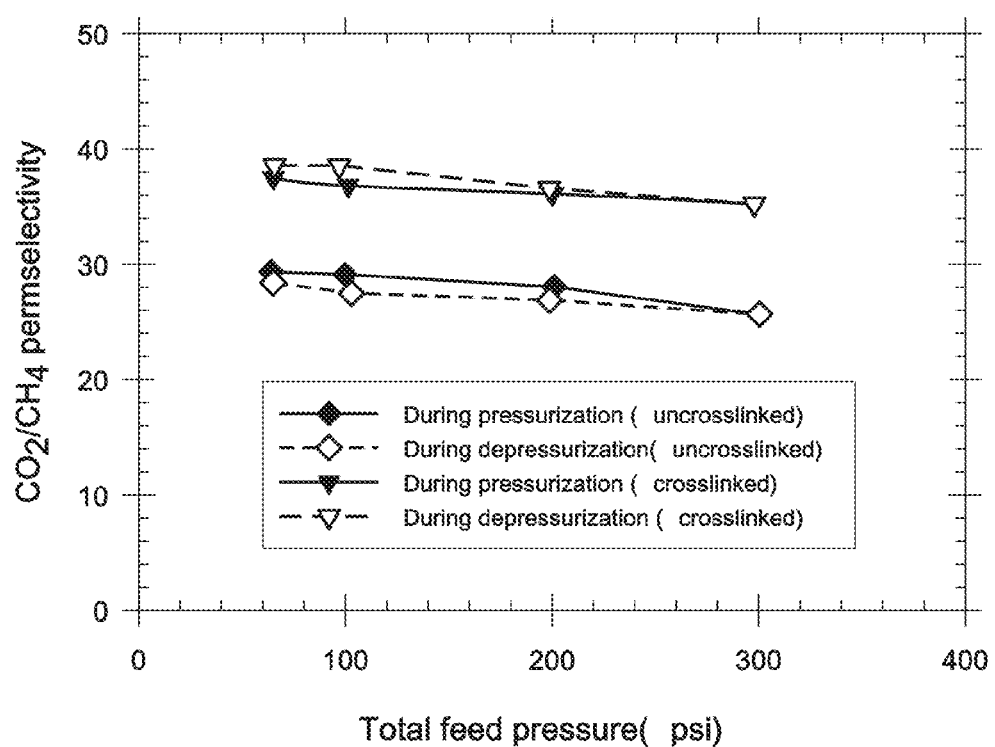
FIG. 13 shows $CO_2/CH_4$ selectivity of uncrosslinked and crosslinked PDMC/Torlon® composite hollow fiber membranes at elevated feed pressures in this work. Selectivities calculated by using fugacity. Test conditions: 50/50 $CO_2/CH_4$, at 35° C.

The natural gas separation performance of PDMC/Torlon® composite hollow fibers were evaluated by using a 50/50 $CO_2/CH_4$ mixed gas feed at a total feed pressure up to 300 psi. FIGS. 12 and 13 show the mixed gas permeation results of both uncrosslinked and 200° C., 2 hours crosslinked PDMC/Torlon® composite hollow fibers.

The mixed gas permeation data in FIG. 12 shows that the uncrosslinked PDMC/Torlon® composite hollow fibers have a slight $CO_2$ permeance upswing at 200 psi of feed pressure, indicative of possible plasticization at a partial $CO_2$ pressure of 100 psi. The plasticization of uncrosslinked monolithic hollow fibers has been reported. Omole, I. C., Crosslinked Polyimide Hollow Fiber Membranes for Aggressive Natural Gas Feed Streams. Ph.D. Dissertation, Georgia Institute of Technology, Atlanta, Ga., 2008. However, no apparent $CO_2$ permeance upswing was found in the crosslinked PDMC/Torlon® composite hollow fibers, an indication of absence of $CO_2$ plasticization. The gas separation performance was double-checked by depressurization. FIG. 12 shows that the crosslinked composite hollow fibers demonstrated a slightly smaller degree of swelling after depressurization than the uncrosslinked fibers, suggesting that crosslinking can stabilize hollow fibers against $CO_2$ induced polymer swelling. Although crosslinking tends to cause a loss of permeance due to the densification of transition layer after crosslinking, the crosslinked composite hollow fibers still show an attractive $CO_2$ permeance of 40 GPU at 100 psi, 35° C.

On the other hand, FIG. 13 shows that the crosslinking improved the separation selectivity from 28 (uncrosslinked) to 39 (crosslinked) at 100 psi feed pressure, 35° C. The crosslinked composite hollow fibers show a $CO_2/CH_4$ selectivity of 39 at 65 psi, which is close to the intrinsic $CO_2/CH_4$ selectivity measured by dense films ($\alpha_{CO2/CH4}$~42), suggesting that there is no apparent skin layer defect in the crosslinked composite hollow fibers. The permeation results of PDMC/Torlon® composite hollow fibers suggest that Torlon® is a promising material as the core layer to develop high performance composite hollow fibers with a significant reduction of membrane formation cost.

Hydrocarbon Contaminants Effects

The present crosslinked composite hollow fibers show attractively high separation performance in a model natural gas feed consisting of only $CO_2$ and $CH_4$. Despite this attractive capability, typical raw natural gas feeds often contain a certain amount of hydrocarbon impurities. To explore this issue, high-performance crosslinked composite hollow fibers were tested in the presence of high levels of contaminants to probe their performance under even challenging feed streams. In this study, the crosslinked composite hollow fibers were further characterized with a feed having a toluene content from 30~1000 ppm in 50/50 $CO_2/CH_4$ mixture at 35° C. The permeation results are summarized in FIGS. 14 and 15.

Figure 14:
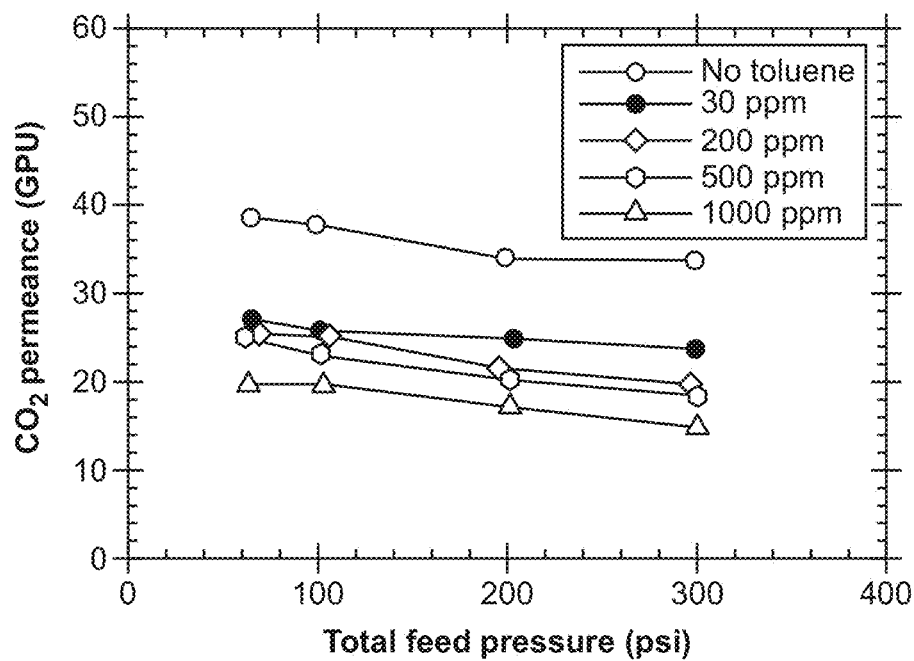
FIG. 14 shows $CO_2$ permeance of crosslinked PDMC/Torlon® composite hollow fiber membranes at different toluene levels from this work. Permeances calculated by using fugacity. Test conditions: 50/50 $CO_2/CH_4$, at 35° C.
Figure 15:
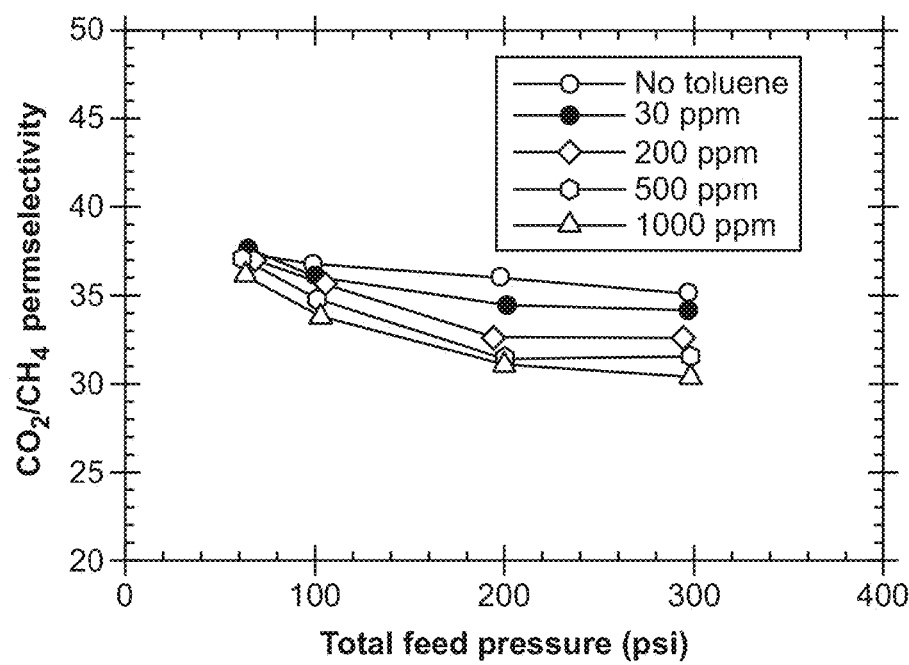
FIG. 15 shows $CO_2/CH_4$ selectivity of crosslinked PDMC/Torlon® composite hollow fiber membranes at different toluene levels from this work. Selectivities calculated by using fugacity. Test conditions: 50/50 $CO_2/CH_4$, at 35° C.

FIG. 14 shows that the increasing of toluene levels reduces the $CO_2$ permeance, which is believed to be due to antiplasticization induced by the toluene contaminant. Antiplasticization occurs when an antiplasticizer affects the fractional free volume in a way that increases the effective stiffness of the polymer.

Despite the permeance loss induced by the antiplasticization, crosslinked PDMC/Torlon® composite hollow fibers maintained a useful $CO_2$ permeance even in the presence of 1000 ppm toluene, which is about 50% higher than what is reported for a crosslinked monolithic hollow fiber in the literature ($CO_2$ permeance ~10 GPU) spun from a similar polymer sample. The $CO_2$ permeance of composite crosslinked hollow fibers under 1000 ppm toluene in the current fibers are lower than that for another monolithic fiber sample ($CO_2$ permeance ~50 GPU), which was spun from another 120 000 Mw batch PDMC. It is not meaningful, however, to compare the productivity of the composite membrane to the monolithic fibers produced from this intrinsically more permeable high molecular weight sample created by a different polymerization route.

In any case, the presence of toluene somehow reduces the $CO_2/CH_4$ selectivity only moderately, since both penetrants are affected, and the composite hollow fibers showed attractively high $CO_2/CH_4$ selectivity above 30 at all testing toluene levels. The high separation performance in the presence of high-level toluene contaminants demonstrates that crosslinked PDMC/Torlon® composite hollow fibers are promising for natural gas separations under extremely challenging feed conditions. With moderate pretreatment to achieve a 30 ppm contaminant level, the antiplasticization effect is greatly moderated. Future studies will seek to reduce the selective layer in the sheath while maintaining to defect-free nature of the membrane.

The present invention therefore provides one with high-performance crosslinked polyimide/polyamide-imide copolymer composite hollow fibers without skin layer defects or delamination of sheath/core layers. A polyamide-imide polymer such as Torlon® demonstrates excellent compatibility with a crosslinkable polyimide sheath layer during spinning, particularly a 6FDA based polyimide. More importantly, Torlon® shows strong thermal stability during aggressive crosslinking without collapse of core layer, which is critical for preserving the high permeance and selectivity of composite hollow fibers. Mixed gas permeation shows that the crosslinked polyimide/polyamide-imide composite hollow fibers have a $CO_2$ permeance of 40 GPU with a $CO_2/CH_4$ selectivity of 39 in testing at 100 psi with 50/50 $CO_2/CH_4$ feed, 35° C. Besides the permeation with clean $CO_2/CH_4$ mixture, the crosslinked polyimide/polyamide-imide composite hollow fibers also demonstrate good separation performance in the presence of a toluene contaminant level up to 1000 ppm, suggesting crosslinked polyimide/polyamide-imide composite hollow fibers are viable under realistic operation conditions.

The advanced dual-layer spinning technique employed as described above can not only significantly reduce the cost of materials used for the hollow fiber formation but also achieve the high separation performance of sheath layer polymer. The significantly improved natural gas separation performance and reduced cost of hollow fiber membrane formation provides a significant advancement in the state of the art for natural gas separations, which is beneficial for commercialization of expensive high performance material by integrating low-cost supporting polymer with expensive sheath layer polymer.

All patents and publications referenced herein are hereby incorporated by reference, in their entirety, to the extent not inconsistent with the present disclosure. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A composite hollow fiber polymer membrane, comprising:
    a porous core layer comprising a polyamide-imide polymer; and
    a selective sheath layer on the core layer comprising a polyimide polymer prepared from monomers A, B, and C wherein
    A is a dianhydride of the formula:

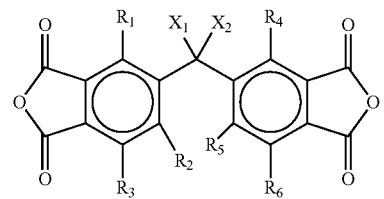

wherein $X_1$ and $X_2$ are independently halogenated alkyl group, phenyl or halogen and $R_1$, $R_2$, $R_3$, $R_4$, $R_5$, and $R_6$ are independently H, alkyl, or halogen;
    B is a diamino cyclic compound without a carboxylic acid functionality; and
    C is a diamino cyclic compound with a carboxylic acid functionality; and
    wherein the polyimide polymer further comprises covalent ester crosslinks.

2. The composite hollow fiber polymer membrane according to claim 1, wherein the polyamide-imide polymer and the polyimide polymer form a homogeneous blend.

3. The composite hollow fiber polymer membrane according to claim 1, wherein A is 4,4'-(hexafluoroisopropylidene) diphthalic anhydride (6FDA).

4. The composite hollow fiber polymer membrane according to claim 1, wherein B is 2,4,6-trimethyl-m-phenylenediamine (DAM).

5. The composite hollow fiber polymer membrane according to claim 1, wherein C is 3,5-diaminobenzoic acid (DABA).

6. The composite hollow fiber polymer membrane according to claim 1, wherein A is 6FDA, B is DAM, and C is DABA.

7. The composite hollow fiber polymer membrane according to claim 6, wherein the polyimide polymer prior to crosslinking to form the covalent ester crosslinks is represented by the formula:

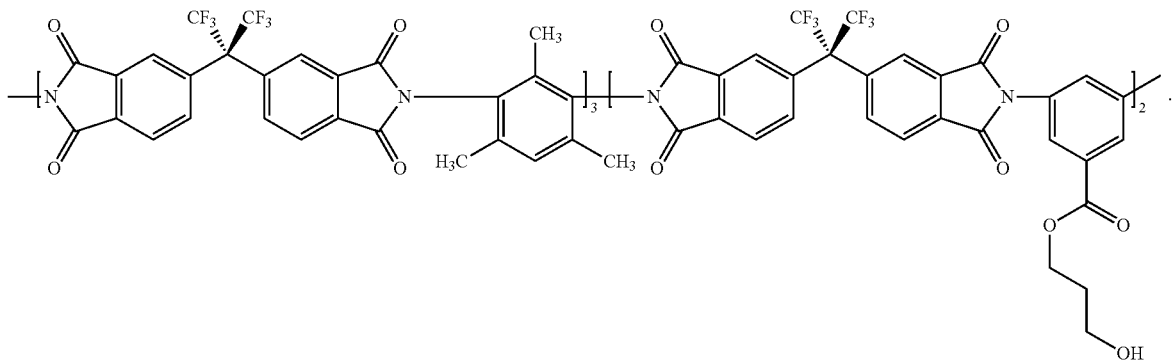

8. The composite hollow fiber polymer membrane according to claim 1, wherein the membrane is a dual layer hollow fiber membrane having a selective outer layer comprising about $1/10^{th}$ by volume of the polyimide polymer that would be employed in a dual layer hollow fiber membrane comprising both a porous substructure layer and selective outer layer made of polyimide polymer.

9. The composite hollow fiber polymer membrane according to claim 1, wherein the polyamide-imide polymer of the core layer is

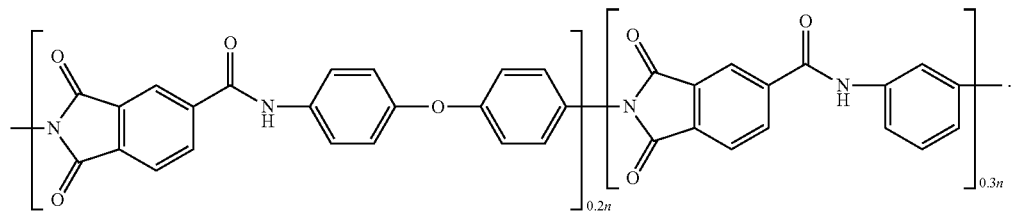

10. A method of making a composite hollow fiber polymer membrane, comprising:
extruding a porous core layer comprising a polyamide-imide polymer and
a selective sheath layer, wherein the selective sheath layer comprises a polyimide polymer prepared from monomers A, B, and C, wherein A is a dianhydride of the formula:

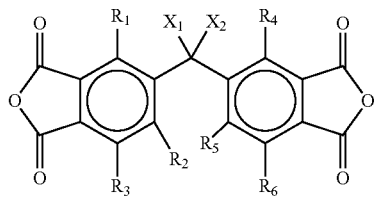

wherein $X_1$ and $X_2$ are independently halogenated alkyl group, phenyl or halogen and $R_1$, $R_2$, $R_3$, $R_4$, $R_5$, and $R_6$ are independently H, alkyl, or halogen;
B is a diamino cyclic compound without a carboxylic acid functionality; and
C is a diamino cyclic compound with a carboxylic acid functionality.

11. A process for purifying natural gas, comprising:
feeding a natural gas stream comprising at least one impurity to at least one membrane unit comprising composite polymer membranes to provide an impurity-rich permeate and an impurity-depleted product gas stream; and
recovering the impurity-depleted product gas stream,
wherein the composite polymer membranes comprise the composite hollow fiber membrane of claim 1.

12. The process according to claim 11, wherein the at least one impurity is selected from the group consisting of $CO_2$, $H_2O$, $H_2S$, and mixtures thereof.

13. The process according to claim 11, wherein the at least one impurity comprises $CO_2$ and $H_2O$.

14. The process according to claim 11, wherein the impurity-depleted product gas stream comprises ≤2 mol % $CO_2$.

15. A composite hollow fiber polymer membrane, comprising:
a porous core layer comprising a polyamide-imide polymer which has a Tg greater than 230° C.; and a selective sheath layer on the core layer comprising a polyimide polymer prepared from monomers A, B, and C wherein A is a dianhydride of the formula

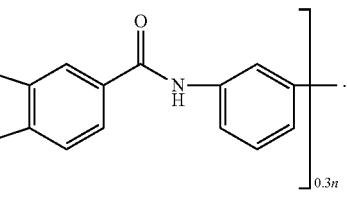

wherein $X_1$ and $X_2$ are independently halogenated alkyl group, phenyl or halogen and $R_1$, $R_2$, $R_3$, $R_4$, $R_5$, and $R_6$ are independently H, alkyl, or halogen;
B is a diamino cyclic compound without a carboxylic acid functionality; and
C is a diamino cyclic compound with a carboxylic acid functionality;
wherein the polyimide polymer further comprises covalent ester crosslinks; and,
with the core layer polymer compatible with the sheath layer polyimide polymer.

16. The composite hollow fiber polymer membrane according to claim 15, wherein the core layer polymer and the sheath layer polyimide polymer are compatible as determined by a lack of delamination upon SEM observation of the cross-section of the hollow fiber after spinning.

17. The composite hollow fiber polymer membrane according to claim 15, wherein the core layer polymer and the sheath layer polyimide polymer are compatible as determined by a lack of delamination upon SEM observation of the cross-section of the hollow fiber after crosslinking.

18. The composite hollow fiber polymer membrane according to claim 15, wherein A is 6FDA, B is DAM, and C is DABA.

19. A process for purifying natural gas, comprising:
feeding a natural gas stream comprising at least one impurity to at least one membrane unit comprising composite polymer membranes to provide an impurity-rich permeate and an impurity-depleted product gas stream; and
recovering the impurity-depleted product gas stream,
wherein the composite polymer membranes comprise the composite hollow fiber membrane of claim 15.

* * * * *

UNITED STATES PATENT AND TRADEMARK OFFICE
CERTIFICATE OF CORRECTION

PATENT NO. : 9,718,031 B2
APPLICATION NO. : 14/323443
DATED : August 1, 2017
INVENTOR(S) : Canghai Ma and William John Koros Page 1 of 1

It is certified that error appears in the above-identified patent and that said Letters Patent is hereby corrected as shown below:

On the Title Page

Please amend (73) Assignees as follows:
Reads: Chevron U.S.A. Inc., San Ramon, CA (US)
Should read: Georgia Tech Research, Atlanta GA (US)

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*